United States Patent
Kunito et al.

(10) Patent No.: US 7,231,658 B2
(45) Date of Patent: Jun. 12, 2007

(54) DATA TRANSMISSION SYSTEM, APPARATUS AND METHOD FOR PROCESSING INFORMATION, APPARATUS AND METHOD FOR RELAYING DATA, STORAGE MEDIUM, AND PROGRAM

(75) Inventors: Yoshiyuki Kunito, Kanagawa (JP);
Nobukazu Koyama, Kanagawa (JP);
Masafumi Kato, Kanagawa (JP);
Tsutomu Miyauchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 803 days.

(21) Appl. No.: 10/314,180

(22) Filed: Dec. 5, 2002

(65) Prior Publication Data
US 2003/0115488 A1    Jun. 19, 2003

(30) Foreign Application Priority Data
Dec. 12, 2001    (JP)    ............... P2001-378414

(51) Int. Cl.
G06F 17/30 (2006.01)
G06F 7/04 (2006.01)
G06K 9/00 (2006.01)

(52) U.S. Cl. .................. 726/2; 709/223; 726/3
(58) Field of Classification Search .......... 726/2, 726/17
See application file for complete search history.

(56) References Cited

U.S. PATENT DOCUMENTS

| | | | | | |
|---|---|---|---|---|---|
| 5,550,896 | A | * | 8/1996 | Chavez, Jr. ............... | 455/411 |
| 5,708,780 | A | * | 1/1998 | Levergood et al. ........ | 709/229 |
| 5,859,967 | A | * | 1/1999 | Kaufeld et al. ............ | 726/5 |
| 5,893,920 | A | * | 4/1999 | Shaheen et al. ........... | 711/133 |
| 6,272,129 | B1 | * | 8/2001 | Dynarski et al. .......... | 370/356 |
| 6,332,163 | B1 | * | 12/2001 | Bowman-Amuah ....... | 709/231 |
| 6,965,926 | B1 | * | 11/2005 | Shapiro et al. ............ | 709/219 |

FOREIGN PATENT DOCUMENTS

| JP | 10-308776 | 11/1998 |
|---|---|---|
| JP | 11-184769 | 7/1999 |

OTHER PUBLICATIONS

Abe et al., "A file transfer system with a network resource scheduling function," 1999, p. 232.

* cited by examiner

Primary Examiner—Kambiz Zand
Assistant Examiner—Jason K. Gee
(74) Attorney, Agent, or Firm—Bell, Boyd & Lloyd LLP

(57) ABSTRACT

A transmitting-end terminal device transmits an electronic mail including large-size data such as video data to a transmitting-end cache via a transmitting-end router. The transmitting-end cache temporarily stores the received data. A POB server authenticates a user of the transmitting-end terminal device and determines whether a receiving-end terminal device can receive the electronic mail. If the authentication of the user is successful and if it is determined that receiving-end terminal device can receive the electronic mail, the transmitting-end cache transmits the electronic mail directly to the receiving-end cache without passing it through the POB server. The receiving-end cache stores the received electronic mail and transmits a message, indicating that the electronic mail has arrived, to the receiving-end terminal device. In response to a request issued by the receiving-end terminal device, the receiving-end cache supplies the electronic mail stored therein to the receiving-end terminal device.

35 Claims, 21 Drawing Sheets

FIG. 6

```
<?xml version="1.0"?>
<terminal name="PEG-N200C" id="12345678" >
 <hardware>
  <io-unit>
   <cpu clock="200" vender="ssss" >
   </cpu>
   <memory type="SDRAM" size="64" />
   <display>
    <color depth="mono" />
    <resolution width="640" height="480" />
   </display>
  </io-unit>
 </hardware>
 <software>
  <application name="MotionViewer" >
   <recvmediay type="video" >
    <format type="MP2TS" />
    <color depth="mono" />
    <resolution width="320" height="160" />
   </recvmedia>
  </application>
 </software>
 <preference>
  <download time="2-7" />
 </preference>
</xml>
```

FIG. 7

```
v=0                                                    (protocol version)
o=mhandley 2890844526 2890842807 IN IP4 126.16.64.4
                                                       (origin:user name,session ID,version,network type,
                                                       address type,session created machine address)
s=SDP Seminar                                          (session name)
i=A Seminar on the session description protocol        (session description)
u=rtsp://host/sample-movie.sdp                         (URI)
c=IN IP4 224.2.17.12/127                               (Connection data:network type,address type,
                                                       connection address/TTL)
t=2873397496 2873404696                                (start time,stop time)
m =audio 49170 RTP/AVP 33                              (media announcement:media,port,transport,
                                                       format list)
                                                       (33:MPEG2-TS)
m=video 51372 RTP/AVP 33
b=AS:1000                                              (bandwidth-value:application specific maximum,
                                                       bandwidth value(KB/sec))
a=framerate:30                                         (frame rate)
a=control:rtsp://host/test.mpg                         (control or media attribute)
i=VOD                                                  (information)
```

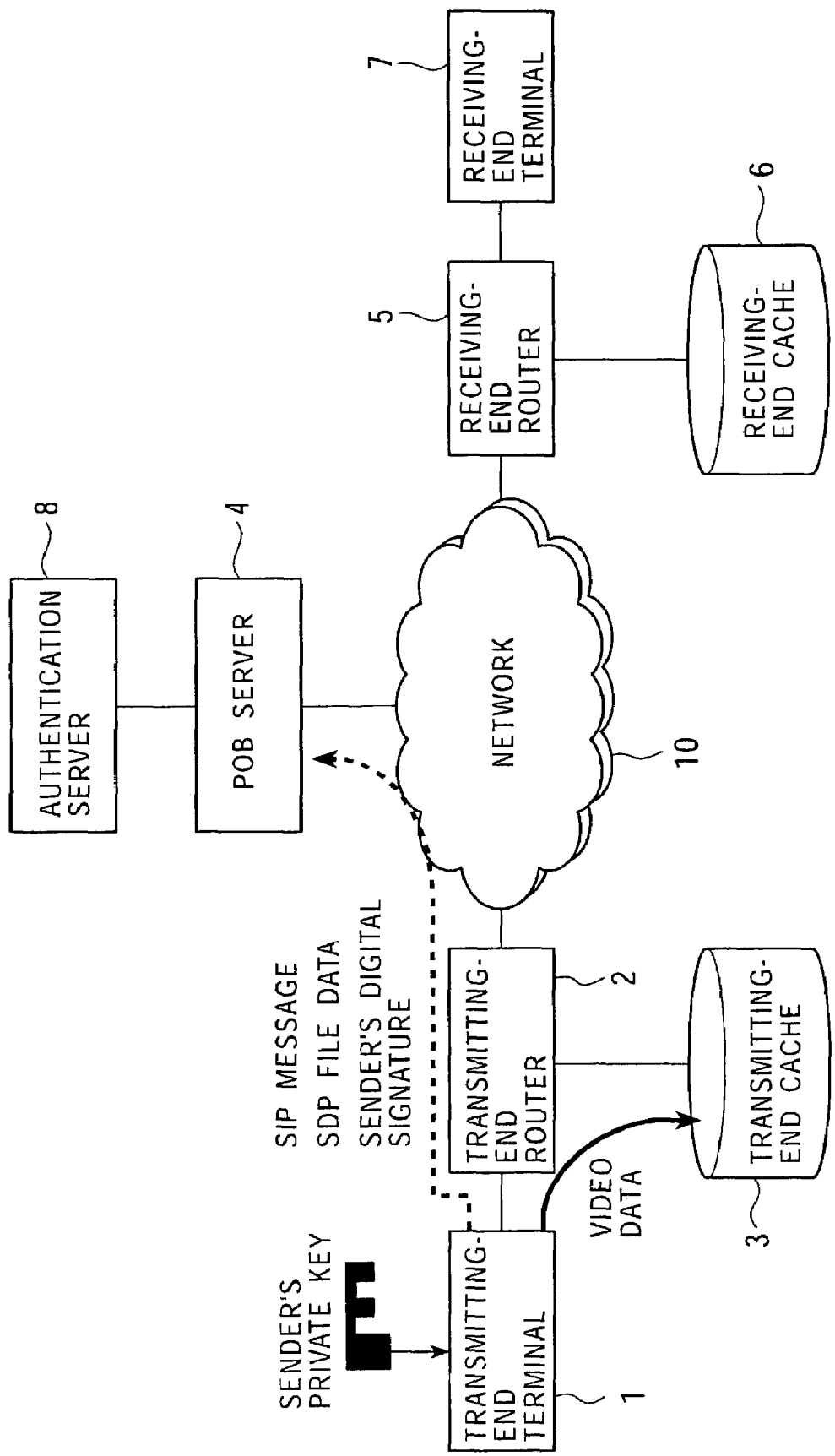

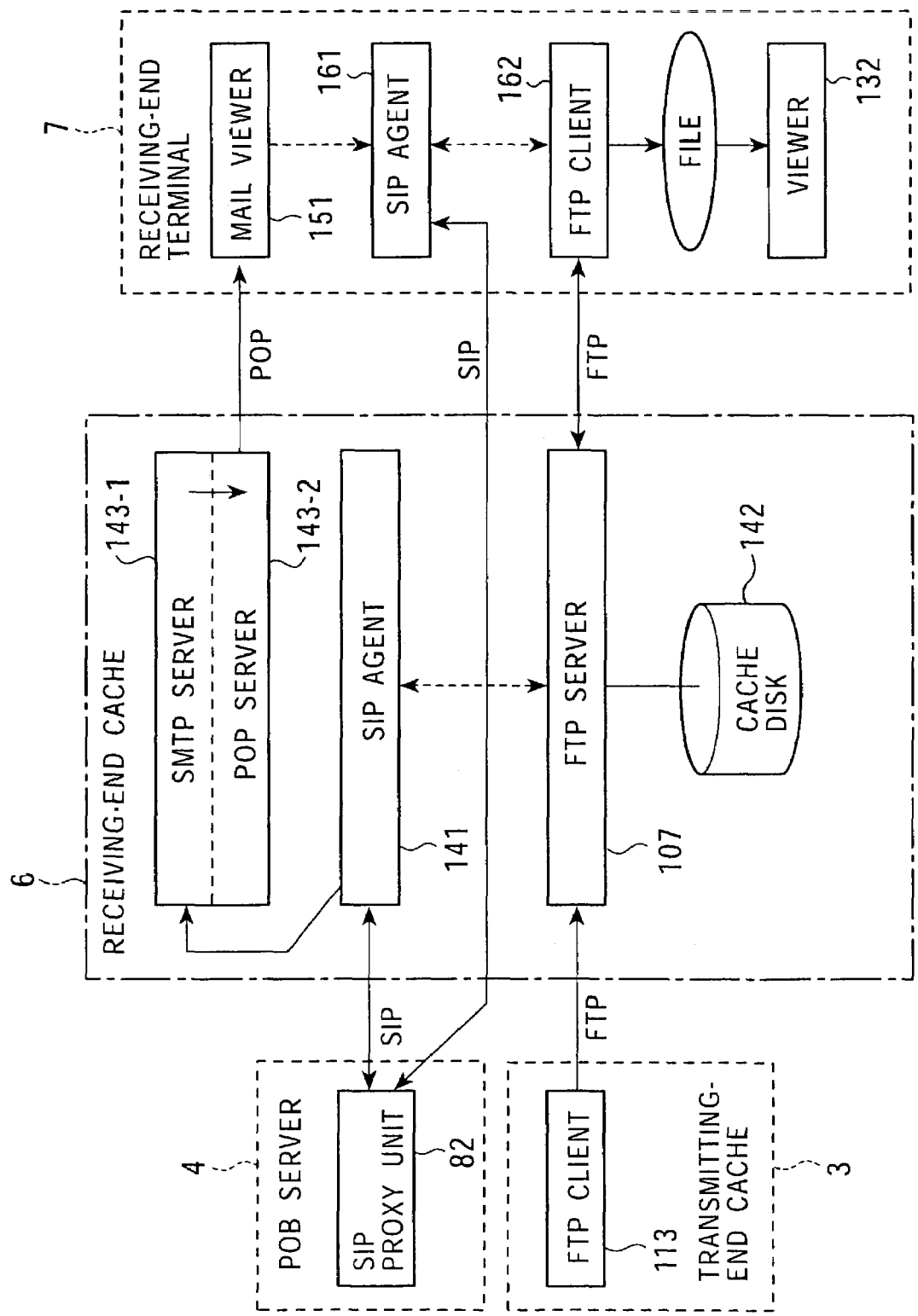

DATA TRANSMISSION SYSTEM, APPARATUS AND METHOD FOR PROCESSING INFORMATION, APPARATUS AND METHOD FOR RELAYING DATA, STORAGE MEDIUM, AND PROGRAM

BACKGROUND OF THE INVENTION

The present invention relates to a data transmission system, a method and apparatus for processing information, a method and apparatus for relaying data, a storage medium, and a program. More particularly, the present invention relates to a data transmission system, a method and apparatus for processing information, a method and apparatus for relaying data, a storage medium, and a program, in which a mediator unit is disposed in a communication path different from a communication path of data transmission so that, in data transmission, the mediator unit authenticates a user of a device at a transmitting end and checks the ability or the state of a device at a receiving end, thereby ensuring that even large-size data can be transmitted and received in a highly reliable fashion.

In recent years, networks such as the Internet have become very popular. As a result, it has become popular to transmit or receive electronic mails or files via the networks. Furthermore, broad band networks have become available, and it has become possible to transmit or receive large-size data such as image data or music data.

When a sender transmits an electronic mail, the sender generally transmits it together with data indicating information associated with the sender such as a sender name to a known address of a receiving terminal apparatus, without caring about the situation or the status of the receiving terminal apparatus.

In the case in which data is transferred using the FTP (File Transfer Protocol), a called information processing apparatus (host computer) authenticates a user of a calling terminal (client). For example, when data is downloaded using the FTP, if a client accesses a host computer, the host computer authenticates a user of the client. If the authentication has been successfully passed, the client retrieves desired data from the host computer and downloads the data. When data is uploaded, the host computer performs user authentication in a similar manner. That is, if the user authentication is successfully passed, the client accesses a desired directory of the host computer and uploads data thereinto.

Furthermore, in recent years, file exchange service has become available. In the file exchange service, a file is exchanged directly between client PCs via the Internet using dedicated software.

For example, if a user installs such client software onto his/her terminal device and executes the client software, the terminal device is automatically connected to a file exchange service information server on the Internet, and a list of data stored by the terminal device and allowed to be brought on public view is transmitted to the server. A user of the terminal device connected to the file exchange service information server can retrieve desired data on the basis of information associated with the data, such as a file name. If the user issues a download command by operating his/her terminal device, the file exchange service information server supplies information associated with a client at which the data is stored. In accordance with the supplied information, the user can download the data directly from the client at which the data is stored.

However, when electronic mails are transmitted in the above-described manner, a receiver receives an electronic mail transmitted from a sender who is not authenticated, and thus the receiver cannot say whether the mail is from a real or bogus sender.

In the case in which data is transferred using the FTP, user authentication is performed by a device from which data is to be transferred. However, it is difficult that each host computer on the Internet performs user authentication on a great number of clients. In many cases, because of the above difficulty, users can freely access a host computer using an account such as anonymous account put on public view. That is, an unidentified user can access a host computer. This results in low security in data transmission.

One technique to avoid the above problem is to dispose a distribution server between a receiving information processing apparatus and a transmitting information processing apparatus and authenticate a user of the receiving information processing apparatus using the distribution server. However, in this technique, when large-size data such as motion image data, still image data, or music data is transferred, large load is imposed on the distribution server disposed at an intermediate location and the total system performance is degraded.

Another possible technique is to use the conventional file exchange system and perform user authentication using a central server. However, the central server performs only user authentication, and transmission of data is performed directly among clients.

In this technique, however, when large-size data is transmitted, a terminal device at a transmitting end transmits the data without caring about the ability or the current status of a terminal device at a receiving end. Thus, if the receiving ability of the terminal device at the receiving end is low as is the case with a low available storage space, the terminal device at the receiving end cannot receive data or a reduction in processing speed occurs. A problem also occurs at the transmitting end. That is, if the terminal device at the transmitting end starts transmission of data when the terminal device at the receiving end is in a state in which the data cannot be received, a reduction in the processing speed of the terminal device at the transmitting end occurs.

SUMMARY OF THE INVENTION

In view of the above, an object of the present invention is to provide a data transmission system in which a mediator disposed in a communication path different from a data transmission path authenticates a user of a transmitting device and checks the ability or the status of a receiving device thereby allowing even large-size data to be transmitted and received in a highly reliable fashion.

According to a first aspect of the present invention, there is provided a data transmission system comprising an information processing apparatus connected to a network, for managing data transmission from a transmitter to a receiver, a first relaying apparatus connected to the network and the transmitter, for relaying the data transmission from the transmitter, and a second relaying apparatus connected to the network and the receiver, for relaying the data transmission to the receiver, wherein the information processing apparatus comprises authentication means for authenticating a user of the transmitter, and query means for querying the second relaying apparatus whether the second relaying apparatus can receive the data transmitted from the transmitter authenticated by the authentication means, the first relaying apparatus comprises first acquisition means for acquiring data to be transmitted from the transmitter, first retaining means for retaining the data acquired by the first acquisition means, and first supply means for supplying the data retained by the first retaining means to the second relaying apparatus, in accordance with the result of the query performed by the query means of the information processing apparatus, and the first relaying apparatus comprises determination means for, in response to the query issued by the query means of the information processing apparatus, determining whether the receiver can receive the data, second acquisition means for acquiring the data from the first relaying apparatus, second retaining means for retaining the data acquired by the second acquisition means, and second supply means for supplying the data retained by the second retaining means to the receiver.

According to another aspect of the present invention, there is provided an information processing apparatus comprising storage means for storing address information of the transmitter, a first relaying apparatus connected to the transmitter, the receiver, and a second relaying apparatus connected to the receiver, address information management means for managing the address information stored in the storage means, authentication means for authenticating a user of the transmitter, first supply means for supplying request information supplied from the first relaying apparatus to the second relaying apparatus, the request information requesting determination of whether transmission of data can be accepted, and second supply means for supplying, to the first relaying apparatus, data supplied from the second relaying apparatus and indicating the result of the determination performed in response to the request information.

The information processing apparatus may further comprise communication mediator means for mediating communication between other apparatuses, in accordance with the address information managed by the address information management means.

Preferably, the authentication means authenticates the user by verifying digital signature data supplied from the transmitter, on the basis of a public key registered in advance by the user. The request information may include information associated with the data to be transmitted.

According to another aspect of the present invention, there is provided an information processing method comprising a storage step of storing of address information of the transmitter, a first relaying apparatus connected to the transmitter, the receiver, and a second relaying apparatus connected to the receiver, an address information management step of managing the address information stored in the storage step, an authentication step of authenticating a user of the transmitter, a first supply step of supplying request information supplied from the first relaying apparatus to the second relaying apparatus, the request information requesting determination of whether transmission of data can be accepted, and a second supply step of supplying, to the first relaying apparatus, data supplied from the second relaying apparatus and indicating the result of the determination performed in response to the request information.

According to another aspect of the present invention, there is provided a first storage medium including a program stored therein, the program comprising a storage step of storing of address information of the transmitter, a first relaying apparatus connected to the transmitter, the receiver, and a second relaying apparatus connected to the receiver, an address information management step of managing the address information stored in the storage step, an authentication step of authenticating a user of the transmitter, a first supply step of supplying request information supplied from the first relaying apparatus to the second relaying apparatus, the request information requesting determination of whether transmission of data can be accepted, and a second supply step of supplying, to the first relaying apparatus, data supplied from the second relaying apparatus and indicating the result of the determination performed in response to the request information.

According to another aspect of the present invention, there is provided a first program for causing a computer to execute a process comprising a storage step of storing of address information of the transmitter, a first relaying apparatus connected to the transmitter, the receiver, and a second relaying apparatus connected to the receiver, an address information management step of managing the address information stored in the storage step, an authentication step of authenticating a user of the transmitter, a first supply step of supplying request information supplied from the first relaying apparatus to the second relaying apparatus, the request information requesting determination of whether transmission of data can be accepted, and a second supply step of supplying, to the first relaying apparatus, data supplied from the second relaying apparatus and indicating the result of the determination performed in response to the request information.

According to another aspect of the present invention, there is provided a first relaying apparatus comprising first acquisition means for acquiring data to be transmitted from the transmitter, retaining means for retaining the data acquired by the first acquisition means, first supply means for supplying request information to an information processing apparatus managing the transmission of data, to request the information processing apparatus to determine whether transmission of data can be accepted, second acquisition means for acquiring, from the information processing apparatus, the result of determination performed in response to the request information supplied from the first supply means, and second supply means for supplying the data retained by the retaining means to another relaying apparatus connected to a receiver specified as a destination, in accordance with the result of the determination acquired by the second acquisition means. The request information may include information associated with the data to be transmitted.

The first acquisition means may acquire all of the data at a time, and the retaining means may retain the data entirely acquired by the first acquisition means. The first acquisition means may acquire the data in the form of streaming data, and the retaining means may retain in real time the data acquired by the first acquisition means.

According to another aspect of the present invention, there is provided a first relaying method comprising a first acquisition step of acquiring data to be transmitted from the transmitter, a retaining step of retaining the data acquired in the first acquisition step, a first supply step of supplying request information to an information processing apparatus managing the transmission of data, to request the information processing apparatus to determine whether transmission of data can be accepted, a second acquisition step of acquiring, from the information processing apparatus, the result of determination performed in response to the request information supplied in the first supply step, and a second supply step of supplying the data retained in the retaining step to another relaying apparatus connected to a receiver specified as a destination, in accordance with the result of the determination acquired in the second acquisition step.

According to another aspect of the invention, there is provided a second storage medium including a program stored therein comprising a first acquisition step of acquiring data to be transmitted from the transmitter, a retaining step of retaining the data acquired in the first acquisition step, a first supply step of supplying request information to an information processing apparatus managing the transmission of data, to request the information processing apparatus to determine whether transmission of data can be accepted, a second acquisition step of acquiring, from the information processing apparatus, the result of determination performed in response to the request information supplied in the first supply step, and a second supply step of supplying the data retained in the retaining step to another relaying apparatus connected to a receiver specified as a destination, in accordance with the result of the determination acquired in the second acquisition step.

According to another aspect of the invention, there is provided a second program for causing a computer to execute a process comprising a first acquisition step of acquiring data to be transmitted from the transmitter, a retaining step of retaining the data acquired in the first acquisition step, a first supply step of supplying request information to an information processing apparatus managing the transmission of data, to request the information processing apparatus to determine whether transmission of data can be accepted, a second acquisition step of acquiring, from the information processing apparatus, the result of determination performed in response to the request information supplied in the first supply step, and a second supply step of supplying the data retained in the retaining step to another relaying apparatus connected to a receiver specified as a destination, in accordance with the result of the determination acquired in the second acquisition step.

According to another aspect of the present invention, there is provided a second relaying apparatus comprising first acquisition means for acquiring request information from an information processing apparatus managing the transmission of data, said request information requesting determination of whether the receiver can receive data, determination means for determining whether the receiver can receive data, in accordance with the request information acquired by the first acquisition means, first supply means for supplying data indicating the result of the determination performed by the determination means to the information processing apparatus, second acquisition means for acquiring the data from another relaying apparatus connected to the transmitter, retaining means for retaining the data acquired by the second acquisition means, and second supply means for supplying the data retained by the retaining means to the receiver.

The request information may include information associated with data to be transmitted, the relaying apparatus may further comprise receiving ability information storage means for storing information associated with the receiving ability of the receiver, and the determination means may perform the determination on the basis of the information associated with the data, included in the request information and, and on the basis of the information associated with the receiving ability of the receiver, stored in the receiving ability information storage means.

The second supply means may supply all of the data at a time. The second supply means may supply the data in the form of streaming data to the receiver, and the receiver may display the data while acquiring the data.

According to another aspect of the present invention, there is provided a second relaying method comprising a first acquisition step of acquiring request information from an information processing apparatus managing the transmission of data, said request information requesting determination of whether the receiver can receive data, a determination step of determining whether the receiver can receive data, in accordance with the request information acquired in the first acquisition step, a first supply step of supplying data indicating the result the determination performed in the determination step to the information processing apparatus, a second acquisition step of acquiring the data from another relaying apparatus connected to the transmitter, a retaining step of retaining the data acquired in the second acquisition step; and a second supply step of supplying the data retained in the retaining step to the receiver.

According to another aspect of the present invention, there is provided a third storage medium including a program stored therein comprising a first acquisition step of acquiring request information from an information processing apparatus managing the transmission of data, said request information requesting determining whether the receiver can receive data, a determination step of determining whether the receiver can receive data, in accordance with the request information acquired in the first acquisition step, a first supply step of supplying data indicating the result of the determination performed in the determination step to the information processing apparatus, a second acquisition step of acquiring the data from another relaying apparatus connected to the transmitter, a retaining step of retaining the data acquired in the second acquisition step; and a second supply step of supplying the data retained in the retaining step to the receiver.

According to another aspect of the present invention, there is provided a third program for causing a computer to execute a process comprising a first acquisition step of acquiring request information from an information processing apparatus managing the transmission of data, said request information requesting determination of whether the receiver can receive data, a determination step of determining whether the receiver can receive data, in accordance with the request information acquired in the first acquisition step, a first supply step of supplying data indicating the result of the determination performed in the determination step to the information processing apparatus, a second acquisition step of acquiring the data from another relaying apparatus connected to the transmitter, a retaining step of retaining the data acquired in the second acquisition step; and a second supply step of supplying the data retained in the retaining step to the receiver.

In the data transmission system according to the present invention, as described above, the system includes the information processing apparatus for managing data transmission from the transmitter to the receiver, the first relaying apparatus connected to the transmitter, for relaying the data transmission from the transmitter, and the second relaying apparatus connected to the receiver, for relaying the data transmission to the receiver, wherein the information processing apparatus authenticates the user of the transmitter and determines whether the receiver can receive data, the first relaying apparatus acquires the data to be transmitted from the transmitter, supplies the data, acquired and retained, to the second relaying apparatus in accordance with the result of the determination performed by the information processing apparatus, and the second relaying apparatus determines whether the receiver can receive the data on the basis of the determination performed by the information processing apparatus, acquires and retains the data from the first relaying apparatus, and supplies the retained data to the receiver. Thus, the data transmission system according to the present invention makes it possible to transmit and receive even large-size data in a highly reliable and efficient manner without imposing significant load on the infrastructure.

In the information processing apparatus, method, and program according to the present invention, address information of the transmitter, a first relaying apparatus connected to the transmitter, the receiver, and a second relaying apparatus connected to the receiver is stored and managed, the user of the transmitter is authenticated, request information supplied from the first relaying apparatus is supplied to the second relaying apparatus to request determination on whether transmission of data can be accepted, data indicating the result of the determination performed in response to the request information is supplied from the second relaying apparatus, and the data indicating the result of the determination is supplied to the first relaying apparatus.

Thus, the information processing apparatus, method, and program according to the present invention make it possible to authenticate a user who wants to transmit or receive data thereby ensuring that the data can be transmitted in a highly secure fashion.

In the first relaying apparatus and associated method, storage medium, and program according to the present invention, data to be transmitted is acquired from the transmitter and retained, request information is supplied to an information processing apparatus managing the transmission of data to request the information processing apparatus to determine whether transmission of data can be accepted, data indicating the result of the determination performed in response to the request information is acquired by the information processing apparatus, and the retained data is supplied to another relaying apparatus connected to the receiver specified as a destination, in accordance with the result of the determination.

In the second relaying apparatus and associated method, storage medium, and program according to the present invention, request information requesting determination of whether a receiver can receive data is acquired from an information processing apparatus managing the transmission of data, in response to the request information, it is determined whether the receiver can receive the data, data indicating the result of the determination is supplied to the information processing apparatus, the data is acquired from another relaying apparatus connected to the transmitter, and the acquired data is supplied to the receiver.

Thus, the relaying apparatus and associated method, storage medium, and program according to the present invention make it possible to transmit data in a proper manner taking into account the status of a receiving device, thereby ensuring that the data can be transmitted in an efficient manner without imposing significant load on the receiving device.

Additional features and advantages of the present invention are described in, and will be apparent from, the following Detailed Description of the Invention and the figures.

BRIEF DESCRIPTION OF THE DRAWINGS

FIG. 6 is a diagram showing an example of information, stored in a receiving-end router, associated with the receiving capability of a receiving-end terminal device;

FIG. 7 is a diagram showing an example of information associated with an electronic mail to be transmitted, wherein the information is supplied from the SIP proxy unit;

FIG. 8 is a diagram showing a manner in which a transmitting-end terminal device transmits an electronic mail including video data;

FIG. 21 is a diagram showing another example of the configuration of software installed on the transmitting-end cache, the POB server, the receiving-end cache, and the receiving-end terminal device so as to be capable of transmitting data by means of streaming to the receiving-end terminal device.

DETAILED DESCRIPTION OF THE INVENTION

Figure 1:
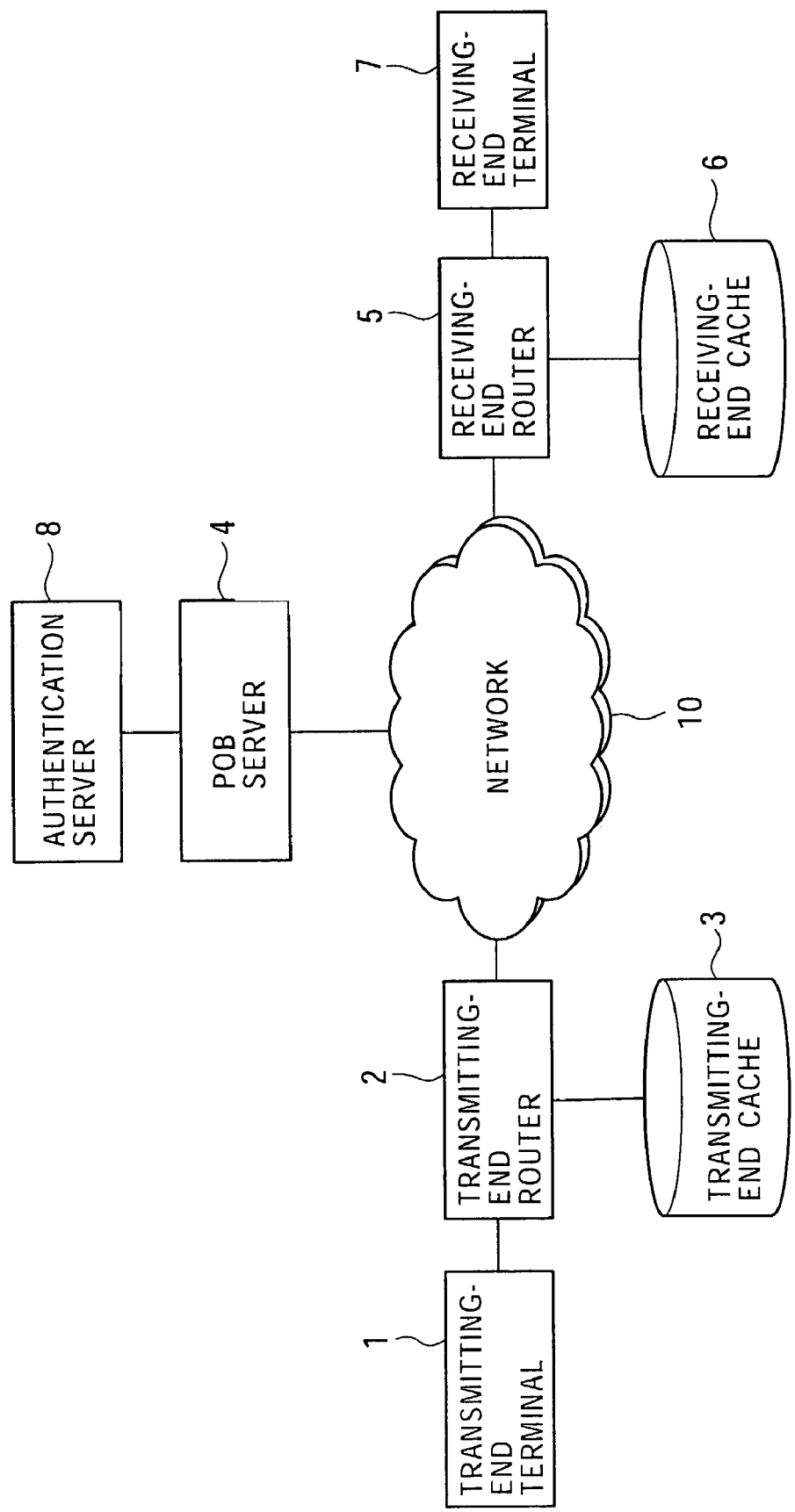
FIG. 1 shows an electronic mail transmission system according to the present invention.

FIG. 1 shows an electronic mail transmission system according to the present invention. In FIG. 1, a transmitting-end terminal device 1 for transmitting an electronic mail is connected to a network 10 (a representative example is the Internet) via a transmitting-end router 2. In addition to the transmitting-end terminal device 1 and the network 10, the transmitting-end router 2 is also connected to a transmitting-end cache 3 for temporarily storing data such as an electronic mail, and the transmitting-end router 2 controls the path of packet communication between the network 10 and the transmitting-end terminal device 1 or the transmitting-end cache 3. A server 4 having a POB-like function (hereinafter, such a server will be referred to simply as a POB server) connected to the network 10 manages the transmission of electronic mails. A receiving-end router 5, connected to a receiving-end cache 6, a receiving-end terminal device 7, and the network 10, controls the path of packet communication between the network 10 and the receiving-end terminal device 7 or the receiving-end cache 6. The receiving-end cache 6, connected to the receiving-end router 5, serves to temporarily store data such as an electronic mail transmitted from the transmitting-end cache 3. The receiving-end terminal device 7, connected to the receiving-end router 5, receives an electronic mail from the receiving-end cache 6 in which the electronic mail addressed to the receiving-end terminal device 7 is stored. An authentication server 8 is connected to the POB server 4. A user of the transmitting-end terminal device 1 is registered in advance in the authentication server 8, and information is supplied in response to a request from the POB server 4.

In FIG. 1, the transmitting-end terminal device 1 transmits an electronic mail addressed to the receiving-end terminal device 7. The electronic mail may include large-size data as with a video mail. The transmitted electronic mail is supplied to the transmitting-end cache 3 via the transmitting-end router 2 and temporarily stored in the transmitting-end cache 3.

The transmitting-end terminal device 1 accesses the POB server 4 via the network 10 to query whether the electronic mail can be transferred to the receiving-end terminal device 7. The POB server 4 acquires information associated with the user from the authentication server 8 and authenticates the user of the transmitting-end terminal device 1. The POB server 4 then queries the receiving-end router 5 whether the receiving-end terminal device 7 can receive the electronic mail transmitted from the transmitting-end terminal device 1.

If the user has been successfully authenticated and if it has been determined that the receiving-end terminal device 7 can receive the electronic mail, the transmitting-end cache 3 transfers the electronic mail directly to the receiving-end cache 6 without passing it through the POB server 4. On receiving the electronic mail, the receiving-end cache 6 retains the electronic mail and transmits a message, indicating that the electronic main has arrived, to the receiving-end terminal device 7.

Thereafter, if the receiving-end cache 6 receives a request from the receiving-end terminal device 7, the receiving-end cache 6 supplies the retained electronic mail to the receiving-end terminal device 7. Thus, even when the electronic mail is large in size, the transmitting-end terminal device 1 can transmit the electronic mail addressed to the receiving-end terminal device 7 in a highly reliable fashion without imposing high load on the system.

Although in the above example the transmitting-end router 2 and the transmitting-end cache 3 are disposed separately, the transmitting-end router 2 and the transmitting-end cache 3 may be integrated into a single unit serving as both the transmitting-end router 2 and the transmitting-end cache 3. Similarly, the receiving-end router 5 and the receiving-end cache 3 may be integrated into a single unit.

Furthermore, the POB server 4 and the authentication server 8 may be integrated into a single unit. On the contrary, the authentication server 8 and the POB server 4 may be connected to each other via the network 10 without being directly connected.

Although in the above example, one transmitting-end terminal device 1, one transmitting-end router 2, and one transmitting-end cache 3 are disposed at the transmitting end from which an electronic mail is transmitted, there is no particular restriction on the number of apparatuses of each type. For example, a plurality of transmitting-end system each including one transmitting-end terminal device 1, one transmitting-end router 2, and one transmitting-end cache 3 may be connected to the network 10, or one transmitting-end router 2 and one transmitting-end cache 3 may be combined with a plurality of transmitting-end terminal devices 1. Similarly, at the receiving end, an arbitrary number of apparatuses of each type may be disposed. Furthermore, there is no particular restriction on the numbers of POB servers 4 and authentication servers 8, and plural POB servers 4 and plural authentication servers 8 may be disposed. However, in this case, some means is necessary to transmit information among the POB servers and among the authentication servers.

Furthermore, although in the embodiments described above, the terminal device, the router, and the cache storage device are disposed at the transmitting end from which an electric mail is transmitted, and the terminal device, the router, and the cache storage device are disposed at the receiving end at which the electric mail is received, the terminal device, the router, and the cache storage device at each end may have both capabilities of transmitting and receiving electronic mails. In this case, a plurality of routers, each connected to a terminal device for transmitting and receiving electronic mails and a cache storage device for temporarily storing electronic mails transmitted from or received by the terminal device, may be connected to the network 10 so that terminal devices can transmit and receive electronic mails via the routers. In this case, each terminal device, router, and cache storage device operate as devices at the transmitting end in the electronic mail transmission system shown in FIG. 1 and also operate as devices at the receiving end, depending on the situation.

Figure 2:
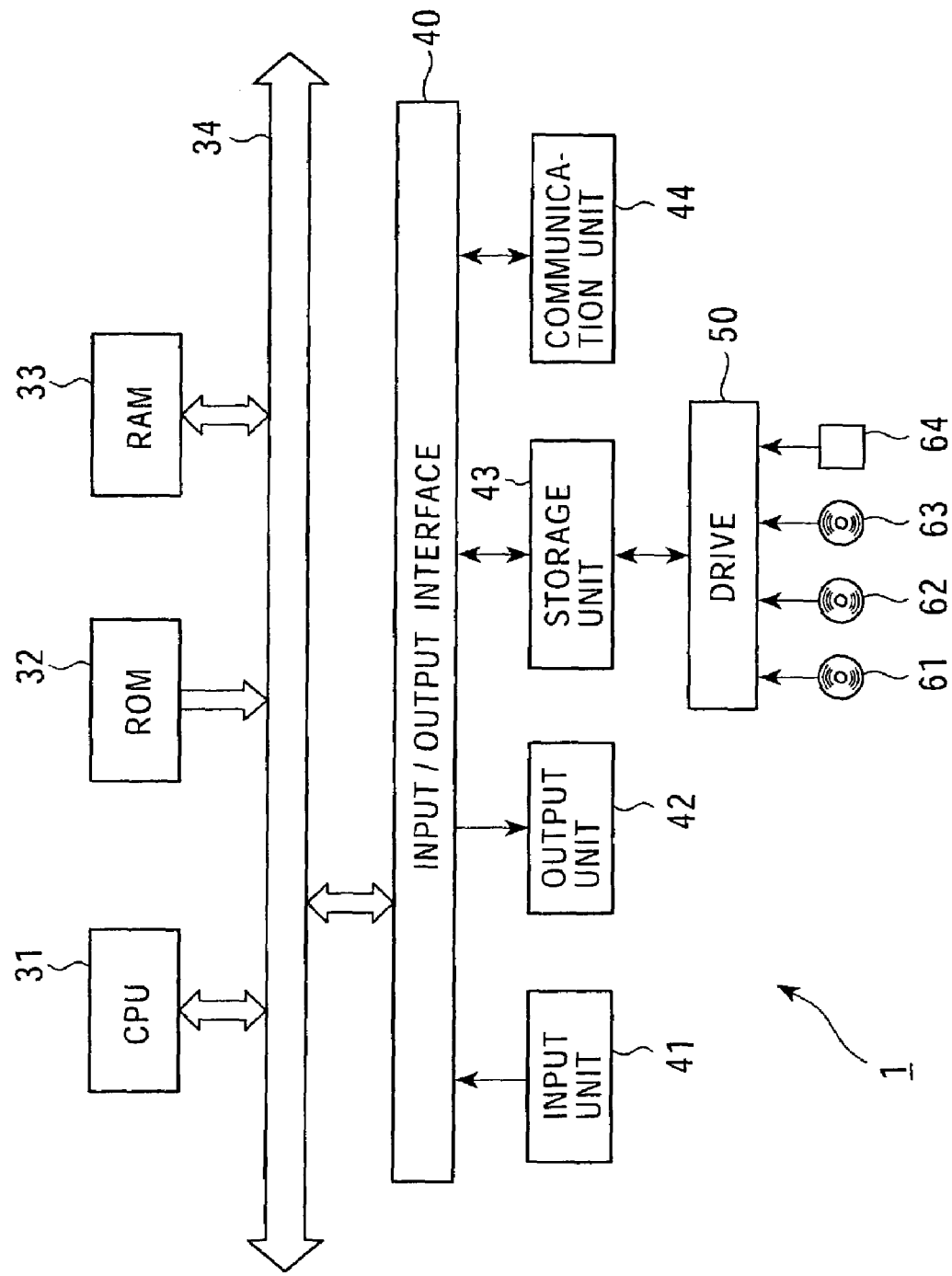
FIG. 2 is a block diagram showing an example of a configuration of a transmitting-end terminal device.

FIG. 2 is a block diagram showing an example of a configuration of the transmitting-end terminal device 1. In FIG. 2, a CPU (Central Processing Unit) 31 performs various processes in accordance with a program stored in a ROM (Read Only Memory) 32 or a program loaded into a RAM (Random Access Memory) 33 from a storage unit 43. The RAM 33 is also used to store data necessary in the various processes performed by the CPU 31. The CPU 31, the ROM 32, and the RAM 33 are connected to each other via a bus 34. The bus 34 is also connected to an input/output interface 40.

The input/output interface 40 is also connected to an input unit 41 including a keyboard and a mouse, an output unit 42 including a display such as a CRT (Cathode Ray Tube) or an LCD (Liquid Crystal Display) and a speaker, a storage unit 43 including a cache memory used as a temporary storage by a drive 50 such as a hard disk, and a communication unit 44 including a modem and a terminal adapter. The communication unit 44 serves to perform communication via the transmitting-end router 2. The communication unit 44 also serves to transmit an analog signal or a digital signal with another user terminal.

The drive 50 or the storage unit 43 connected to the input/output interface 40 are not necessarily needed in the transmitting or receiving terminal device. Specific examples of the drive 50 include a magnetic disk 61, an optical disk 62, a magneto optical disk 63, and a semiconductor memory 64. In a case in which the drive 50 is provided in the transmitting or receiving terminal device, a computer program for controlling the CPU is read from the drive 50. However, in a case in which the drive 50 is not provided, the computer program is stored in the ROM 32.

Although not shown in the figures, each of the transmitting-end router 2, the transmitting-end cache 3, the receiving-end router 5, the receiving-end cache 6, the receiving-end terminal device 7, and the authentication server 8 is made up of a computer having a similar configuration to that of the transmitting-end terminal device 1 shown in FIG. 2. The drive 50 shown in FIG. 2 may also be used as a cache memory of the transmitting-end cache 3 or the receiving-end cache 6.

Figure 3:
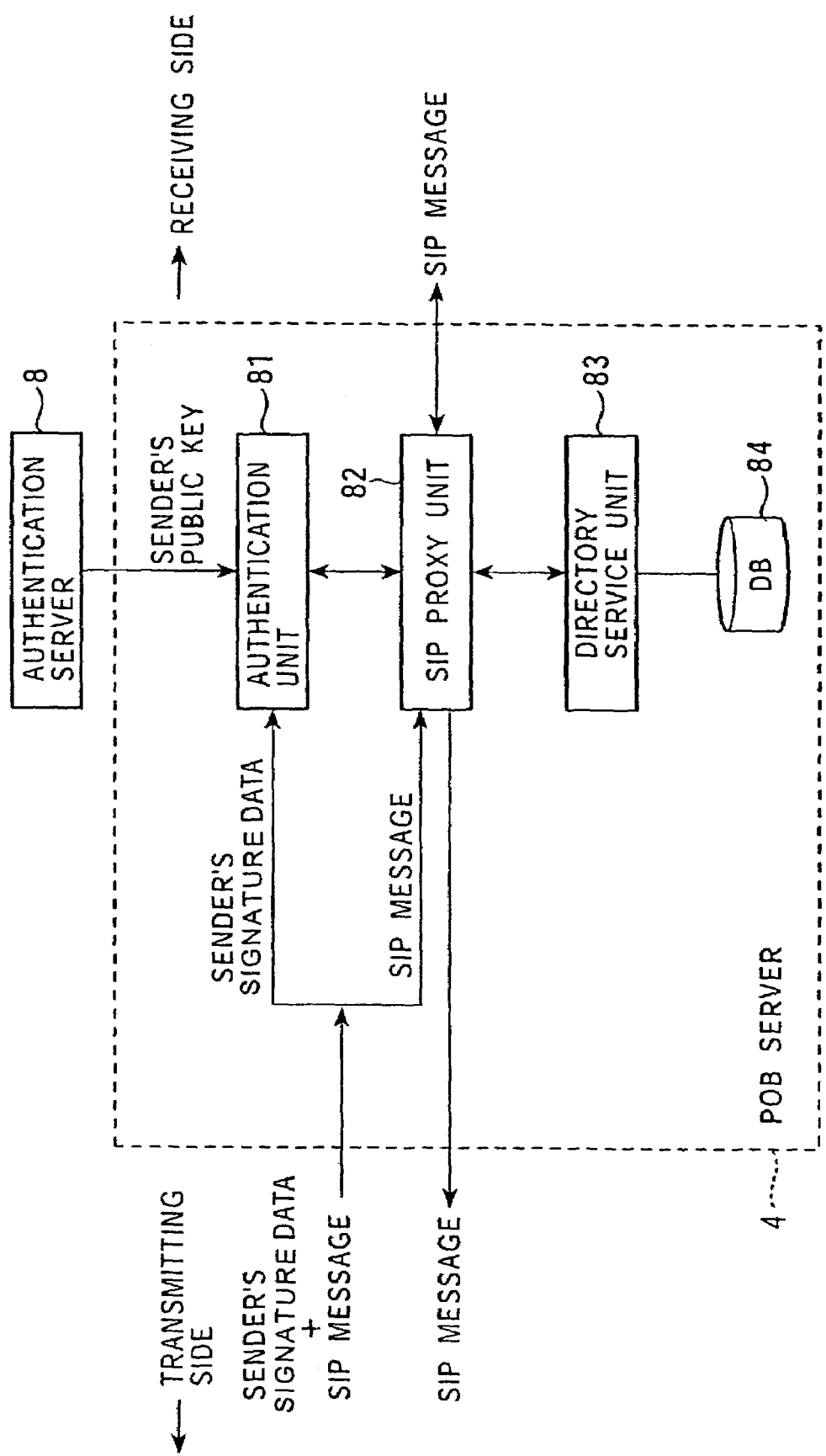
FIG. 3 is a block diagram showing an example of a configuration of a POB server.

FIG. 3 is a block diagram showing an example of a configuration of the POB server 4. As shown in FIG. 3, the POB server 4 includes an authentication unit 81 for authenticating a user of a transmitting-end terminal requesting a communication, an SIP proxy unit 82 for communicating with other devices or mediating communication among other devices, using an SIP (Session Initiation Protocol), a directory service unit 83 for managing address information of other devices, and a database 84 for storing address information of other devices. The authentication unit 81, the SIP proxy unit 82, the directory service unit 83, and the database 84 are each constructed, for example, as shown in FIG. 2. The SIP proxy unit 82 is connected to the authentication unit 81 and the directory service unit 83 so that communication with them is possible as required. The authentication unit 81 is also connected to the authentication server 8. The database 84 is also connected to the directory service unit 83 so that, under the control of the directory service unit 83, the database 84 can supply information to the directory service unit 83 and can receive information from the directory service unit 83. The whole or part of each of the authentication unit 81, the SIP proxy unit 82, and the directory service unit 83 may be realized by means of software.

The outline of the process performed by the POB server 4 is described below. In FIG. 3, first, an SIP message indicating that the transmitting-end terminal device 1 desires to transmit data is supplied together with sender's signature data to the POB server 4. The sender's signature data is transferred to the authentication unit 81, and the SIP message is transferred to the SIP proxy unit 82. Herein, the SIP is a signaling control protocol used in a session layer to establish, maintain, and terminate a session. If the SIP proxy unit 82 receives the SIP message requesting the process associated with the transmission, the SIP proxy unit 82 requests the authentication unit 81 to perform user authenticate on the sender's signature data. In response to the request, the authentication unit 81 acquires a certificate including a public key of the sender from the authentication server 8 and performs the user authentication by verifying the sender's signature data using the acquired public key. If the authentication is completed, the authentication unit 81 returns data indicating the authentication result to the SIP proxy unit 82.

The SIP proxy unit 82 acquires address information of the receiving-end router 5 via the directory service unit 83 and transmits an SIP message to the receiving-end router 5 to query whether the receiving-end router 5 can accept an electronic mail. If the SIP proxy unit 82 receives a response message from the receiving-end router 5, and if the response message and the authentication result received from the authentication unit 81 are both affirmative, the SIP proxy unit 82 supplies an SIP message, indicating that the transmission of the electronic mail is acceptable, to the transmitting-end cache 3.

The POB server 4 checks whether transmission of an electronic mail is acceptable in the above-described manner. In the above process, the address information of each device at the transmitting end is registered in advance in the database 84 via the SIP proxy unit 82 and managed by the directory service unit 83.

Figure 4:
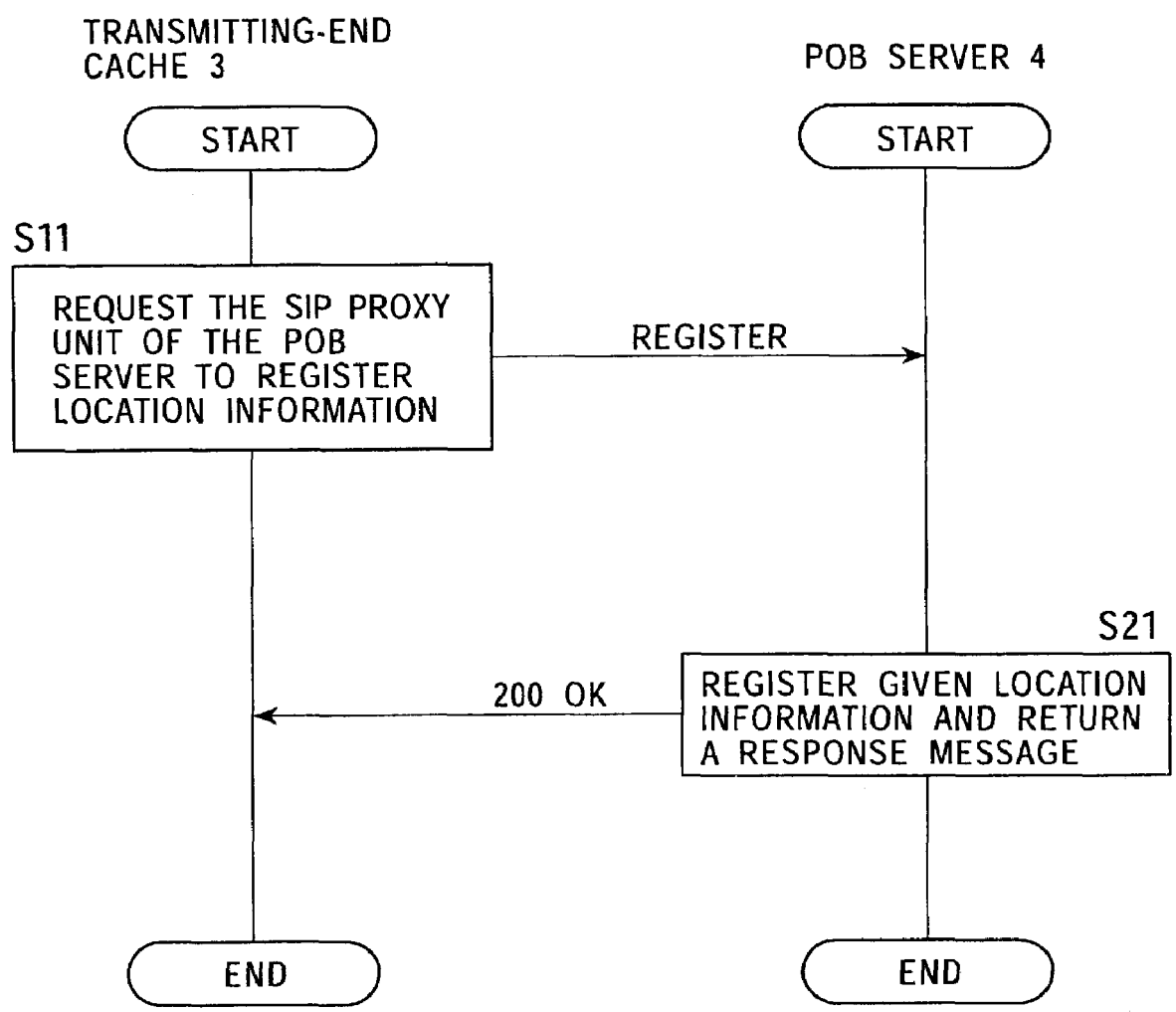
FIG. 4 is a flow chart showing a process in which a transmitting-end cache registers address information into the POB server.

Referring to a flow chart shown in FIG. 4, a process performed by the transmitting-end cache 3 to register address information into the POB server 4 is described below. First, in response to a registration command issued by the transmitting-end terminal device 1, the transmitting-end cache 3 supplies, in step S11, transmitting-end location information including address information, such as that shown below, to the SIP proxy unit 82 of the POB server 4 thereby requesting registration associated with devices at the transmitting end.

REGISTER sip:ssss.com SIP/2.0
From:sip:userA@ssss.com
To:sip:userA@ssss.com
Contact:sip:userA@cacheA.ssss.com;
feature=pobox The REGISTER message is a message issued by the transmitting-end cache 3 to register location information into the POB server 4. The description in the first row of the REGISTER message indicates that it is requested to register the location information at "sip:ssss.com". Herein, "ssss.com" denotes the address of the proxy server.

In the second row, "From" denotes a header indicating an issuer (userA@ssss.com) of the registration request. In the third row, "To" indicates an identifier of the sender (userA@ssss.com) to be registered into the POB server 4. "cacheA.ssss.com" is the address of the transmitting-end cache 3. "userA@cacheA.ssss.com" is address information of the user of the transmitting-end cache 3.

In the fifth row, "feature" declares what function the registered device has. More specifically, "feature=pobox" indicates that the POB (Post Office Box) capability is provided. The above-described message specifies userA@cacheA.ssss.com as the contacting address for electronic mails addressed to userA@ssss.com, that is, the message specifies that any electronic mail addressed to userA@ssss.com should be transferred to userA@cacheA.ssss.com. Upon receiving the REGISTER message described above, the POB server 4 registers, in step S21, the acquired location information using the SIP proxy unit 82 and returns an OK message as a response message to the transmitting-end cache 3. In the above-described manner, the transmitting-end cache 3 registers address information into the POB server 4. Similarly, address information of device at the receiving end is registered in advance into the database 84 via the SIP proxy unit 82 and managed by the directory service unit 83.

Figure 5:
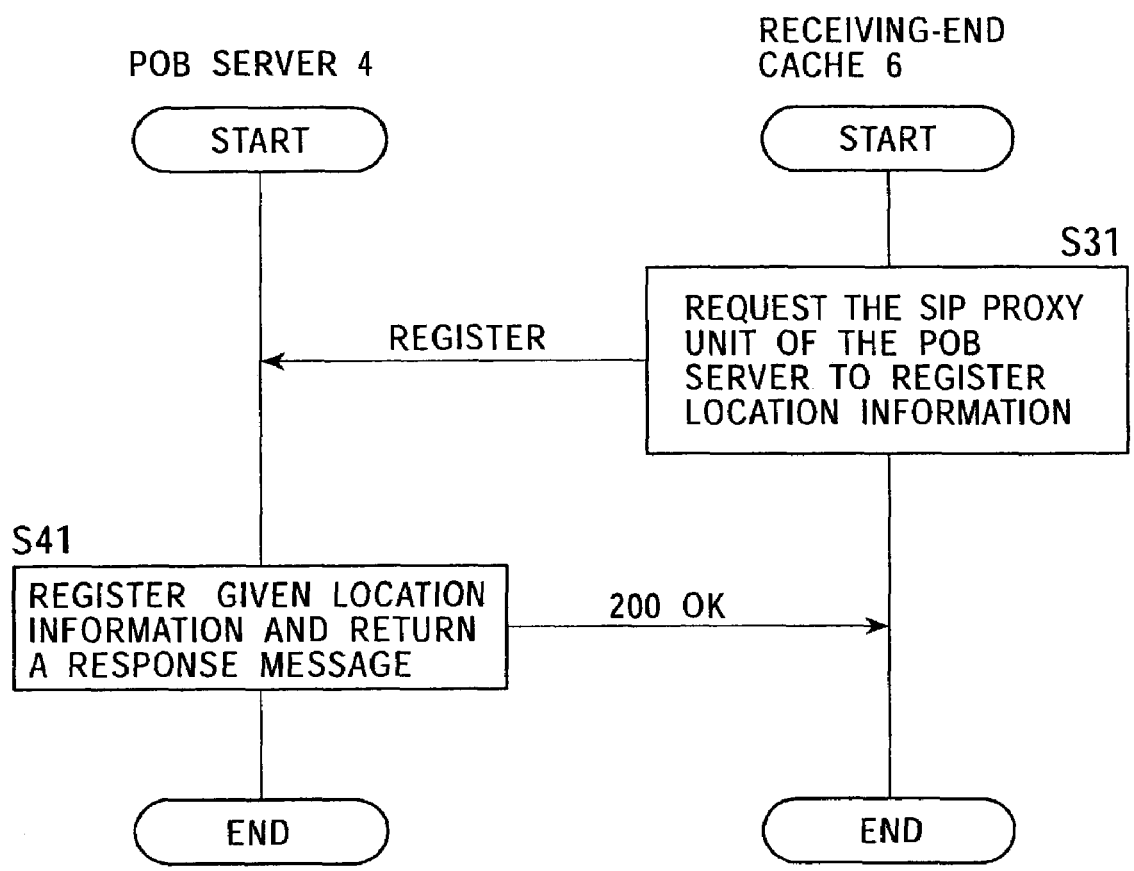
FIG. 5 is a flow chart showing a process in which a receiving-end cache registers address information into the POB server.

Referring to a flow chart shown in FIG. 5, a process performed by the receiving-end cache 6 to register address information into the POB server 4 is described below. First, in step S31, in response to a registration command issued by the receiving-end terminal device 7, the receiving-end cache 6 supplies receiving-end location information including address information, such as that shown below, to the SIP proxy unit 82 of the POB server 4 thereby requesting registration associated with devices at the receiving end.

REGISTER sip:ssss.com SIP/2.0

From:sip:userB@ssss.com
To:sip:userB@ssss.com
Contact:sip:userB@cacheB.ssss.com;
feature=pobox In the above message, "userB" denotes the user of the receiving-end terminal device 7, and "cacheB.ssss.com" denotes the address of the receiving-end cache 6. In the above message, "userB@cacheB.ssss.com" is specified as the contacting address for "userB@ssss.com", that is, it is specified that any electronic mail addressed to userB@ssss.com should be transferred to userB@cacheB.ssss.com.

If the POB server 4 receives the REGISTER message described above, the POB server 4 registers, in step S41, the acquired location information using the SIP proxy unit 82 and returns an OK message as a response message to the receiving-end cache 6. In the above-described manner, the receiving-end cache 6 registers address information into the POB server 4.

In FIG. 3, information associated with the receiving-end terminal device 7 may be stored in advance in the receiving-end router 5, so that when the SIP proxy unit 82 requests the receiving-end router 5 to determine whether an electronic mail can be received, the SIP proxy unit 82 supplies information, acquired from the transmitting-end cache 3, about an electronic mail to be transmitted from the transmitting end to the receiving-end router 5 together with the request information, and the receiving-end router 5 determines whether the electronic mail can be received on the basis of the information associated with the receiving-end terminal device 7 stored in advance and also on the basis of the information associated with the electronic mail to be transmitted from the transmitting end, acquired from the SIP proxy unit 82.

FIG. 6 shown an example of information, stored in the receiving-end router 5, associated with the receiving capability of the receiving-end terminal device 7. In FIG. 6, information about the receiving ability of the receiving-end terminal device 7 is described in XML (eXtensible Mark Language). <terminal name="PEG-N200C"id="12345678"> indicates the device name and the ID information of the receiving-end terminal device 7. Information about the hardware configuration of the receiving-end terminal device 7 is described in a part distinguished by <hardware> tags. Information about software to be used is described in a part distinguished by <software> tags.

FIG. 7 shows an example of information associated with an electronic mail to be transmitted, wherein the information is supplied from the SIP proxy unit 82. In FIG. 7, the information associated with the electronic mail to be transmitted is described in the SDP (Session Description Protocol). In FIG. 7, in the second row, information indicating a user name who has transmitted electronic mail data and information indicating a session ID are described. In the sixth row, "c=IN IP4 224.2.17.12/127" represents information associated with connection. In the eighth row, "m=audio 49170 RTP/AVP 33" represents information associated with audio data.

In accordance with the information, shown in FIG. 6, indicating the receiving capability of the receiving-end terminal device 7 and in accordance with the information, shown in FIG. 7, associated with the electronic mail to be transmitted, the receiving-end router 5 determines whether the electronic mail can be accepted.

Although in the example shown in FIG. 6, the information indicating the receiving capability of the receiving-end terminal device 7 is described in the XML, the information may be described in any format. Furthermore, although in the example shown in FIG. 7, the information associated with the electronic mail to be transmitted is described in the SDP, the information may be described in any proper protocol.

Now, a specific process of transmitting an electronic mail in the present system is described below. FIG. 8 shows a manner in which the transmitting-end terminal device 1 transmits an electronic mail including video data. In response to an operation performed by a user, the transmitting-end terminal device 1 to supply an electronic mail including video data to be transmitted to the transmitting-end cache 3 via the transmitting-end router 2. The transmitting-end cache 3 temporarily stores the supplied electronic mail. The transmitting-end terminal device 1 then produces digital signature data using a private key of the sender and supplies, to the POB server 4, the produced digital signature data, a message indicating a request for transmission of the electronic mail, and an SDP file including information associated with the video data included in the electronic mail.

Figure 9:
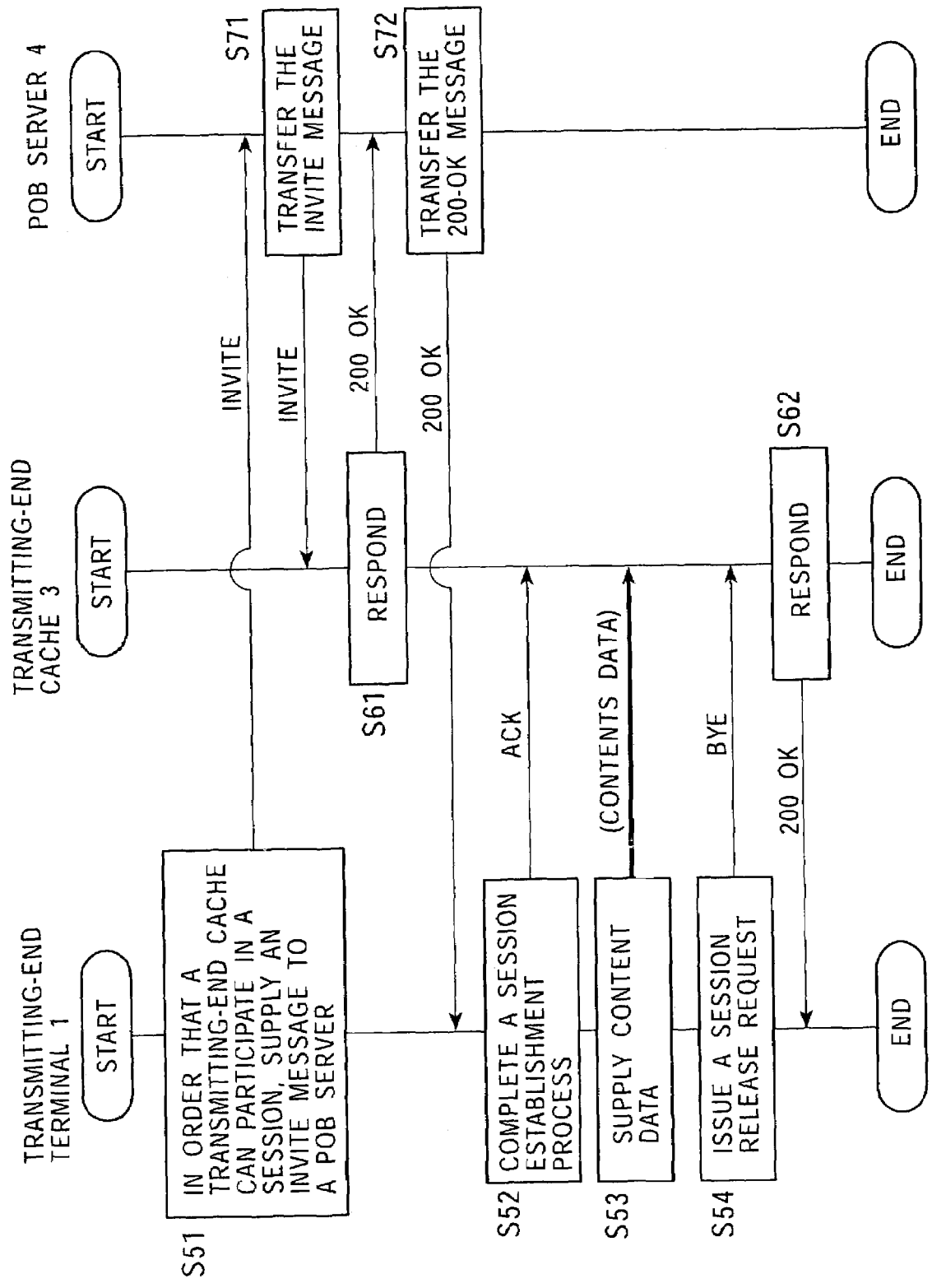
FIG. 9 is a flow chart showing a process in which the transmitting-end terminal device supplies electronic mail data including video data to the transmitting-end cache.

Referring to a flow chart shown in FIG. 9, a process performed by the transmitting-end terminal device 1 for supplying electronic mail data including the video data to the transmitting-end cache 3 is described below. First, in step S51, to determine where "content" of "terminal A" should be first placed, the transmitting-end terminal device 1 supplies an INVITE message to the POB server 4 to request the transmitting-end cache 3 to participate in a session. A specific example of the INVITE message is shown below.
INVITE sip:userA@ssss.com SIP/2.0
From:sip:userA@ssss.com
To:sip:userA@ssss.com
Accept-Contact:*;feature=pobox;
Contact:sip:content@terminalA.ssss.com Herein, the INVITE message is a message issued by the transmitting-end terminal device 1 in order to establish a session between the transmitting-end terminal device 1 and a device at which "content" data to be transmitted can be temporarily placed. In order to determine the location at which content data to be transmitted should be placed, the INVITE message is first transmitted to the POB server 4. In the fourth row, it is described that use of POB service is requested. In the fifth row, it is described what content data is to be transmitted. In this specific example, the content name of the content data to be transmitted is "content".

If the POB server 4 receives the INVITE message, the POB server 4 checks the registration data (registered as described above with reference to FIG. 4) to determine the contacting device (contacting address) for "userA@ssss.com". In this specific example, it is determined that the transmitting-end cache 3 (userA@cacheAssss.com) is specified as the contacting device (contacting address) for "userA@ssss.com". Thereafter, in step S71, the POB server 4 transfers the INVITE message received from the transmitting-end terminal device 1 to the transmitting-end cache 3. When the INVITE message is transferred, it is rewritten as follows.
INVITE sip:userA@cacheA.ssss.com SIP/2.0
From:sip:userA@ssss.com
To:sip:userA@ssss.com
Accept-Contact:*;feature=pobox;
Contact:sip:content@terminalA.ssss.com In the first row, the destination of the INVITE message is rewritten from "sip:userA@ssss.com" to "sip:userA@cacheAssss.com" to indicate that the INVITE message should be transferred to the transmitting-end cache 3.

When the transmitting-end cache 3 receives the INVITE message, if the transmitting-end cache 3 can participate in the session, the transmitting-end cache 3 returns, in step S61, a response message to the POB server 4 from which the INVITE message has been received. A specific example of the response message is shown below.
SIP/2.0 200 OK
To:sip:userA@ssss.com
From:sip:userA@ssss.com
Contact:sip:content@cacheA.ssss.com;feature=pobox In the first row of the response message, "OK" indicates that supplying of data (by participating in the session) is permitted, that is, the response message is an OK message. If the POB server 4 receives this response message (OK message), the POB server 4 transfers, in step S72, the received response message to the issuer of the corresponding INVITE message, that is, the transmitting-end terminal device 1.

Upon receiving the response message, in step S52, the transmitting-end terminal device 1 supplies an ACK message to the issuer of the response message, that is, the transmitting-end cache 3. Thus, the session has been established. An example of the ACK message is shown below.
ACK sip:content@cacheA.ssss.com SIP/2.0
To:sip:userA@ssss.com
From:sip:userA@ssss.com
Contact:sip:content@cacheA.ssss.com;feature=pobox The ACK message is a message issued, in response to the INVITE message, to finish the transaction started by the INVITE message. In the first row of the ACK message, it is described that this ACK message should be supplied to the transmitting-end cache 3.

After transmitting the ACK message, the transmitting-end terminal device 1 supplies, in step S53, an electronic mail including video data as the content data to the transmitting-end cache 3, using the FTP or the like. After completion of supplying the content data, the transmitting-end terminal device 1 supplies, in step S54, a BYE message to the transmitting-end cache 3 to request release of the session. An example of the BYE message is shown below.
BYEsip:content@cacheA.ssss.com SIP/2.0
To:sip:userA@ssss.com
From:sip:userA@ssss.com The BYE message is a message supplied from the transmitting-end terminal device 1 to the transmitting-end cache 3 to request release of the session. In the first row, it is described that the BYE message is addressed to the transmitting-end cache 3. If the transmitting-end cache 3 receives the BYE message, the transmitting-end cache 3 transmits a response message such as that shown below to the transmitting-end terminal device 1.
SIP/2.0 OK
To:sip:userA@ssss.com
From:sip:userA@ssss.com Upon receiving the response message, the transmitting-end terminal device 1 terminates the session with the transmitting-end cache 3. Although in the above example, the content name, that is, the name of the video data stored in the transmitting-end cache, is "content", the content name it not limited to that but an arbitrary content name may be employed.

Figure 10:
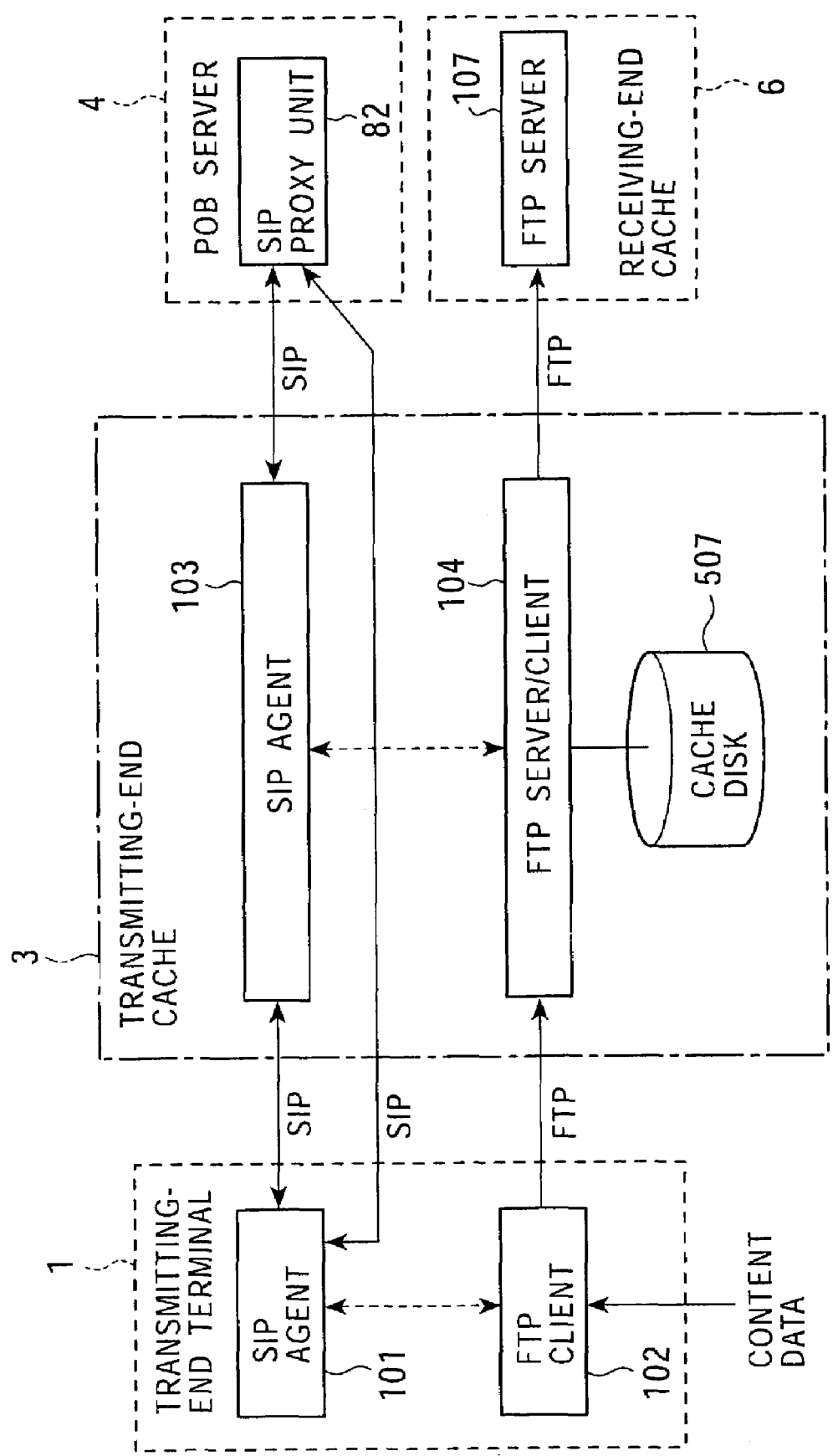
FIG. 10 is a diagram showing an example of the configuration of software installed on the transmitting-end terminal device, the transmitting-end cache, the POB server, and the receiving-end cache.

FIG. 10 shows an example of the configuration of software installed on the transmitting-end terminal device 1, the transmitting-end cache 3, the POB server 4, and the receiving-end cache 6, to perform the above-described process. In FIG. 10, the transmitting-end terminal device 1 includes an SIP agent 101 and an FTP client 102, and the transmitting-end cache 3 includes an SIP agent 103, an FTP server/client 104, and a cache disk 105. The receiving-end cache 6 includes an FTP server 107.

The SIP agents 101 and 103 and the SIP proxy unit 82 communicate with each other by means of SIP to establish or release a communication session between devices. In accordance with a command issued by the SIP agent 101, the FTP client 102 connects itself with the server capability of the FTP server/client 104 and supplies content data such as a video data thereto. As described above, in a case in which the transmitting-end terminal device 1 includes an SIP agent, transmission of content data from the transmitting-end terminal device 1 to the transmitting-end cache 3 is performed using a file transfer protocol such as the FTP.

In a case in which the transmitting-end terminal device 1 does not have an SIP agent, transmission of content data from the transmitting-end terminal device 1 to the transmitting-end cache 3 may be performed by means of streaming using a protocol such as RTSP (Real-Time Streaming Protocol), RTP (Real-Time Transport Protocol)/RTCP (Real-Time Transport Protocol Control Protocol).

Figure 11:
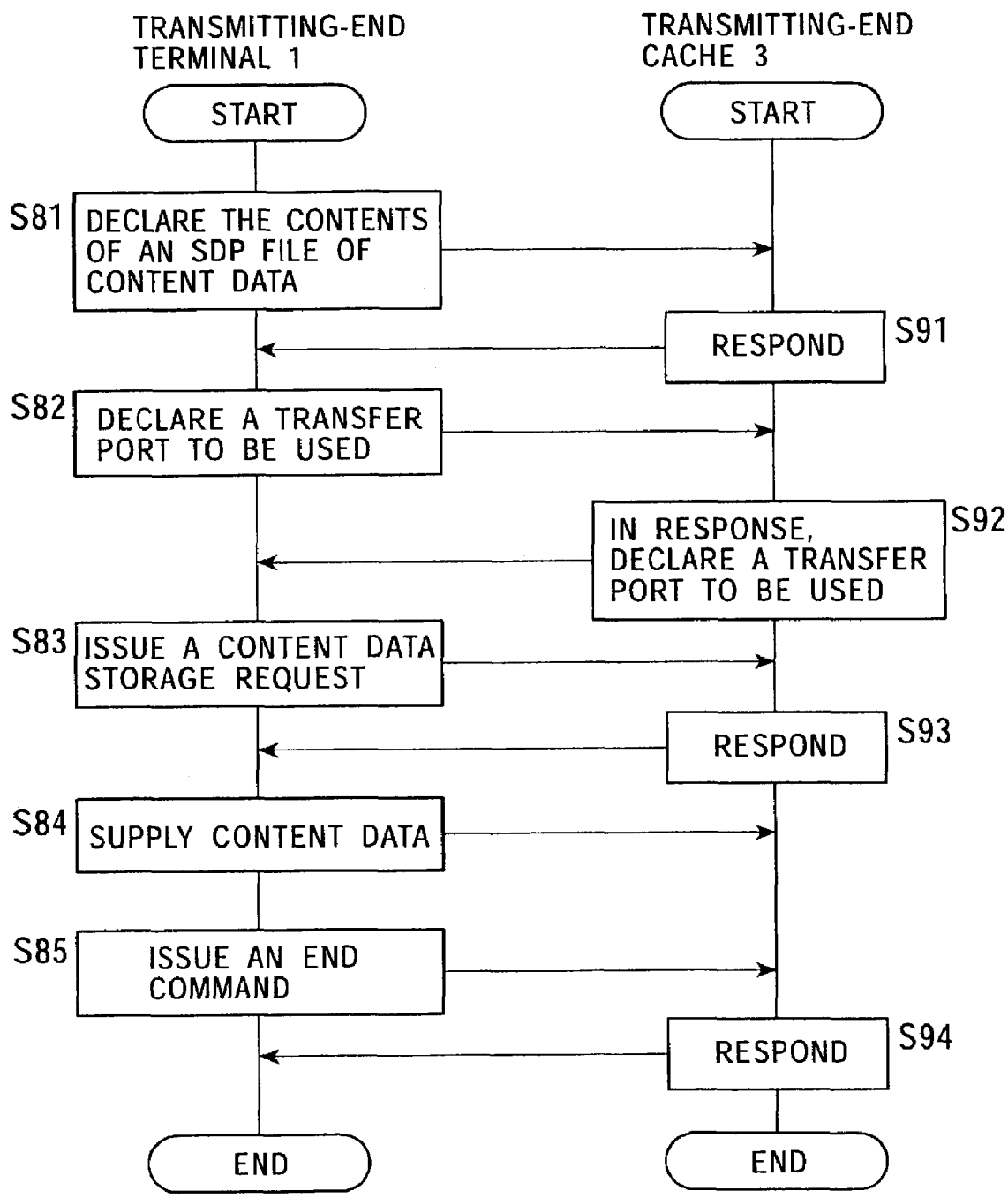
FIG. 11 is a flow chart showing a process in which content data is transmitted by means of streaming from the transmitting-end terminal device to the transmitting-end cache.

Referring to a flow chart shown in FIG. 11, a process of transmitting content data by means of streaming from the transmitting-end terminal device 1 to the transmitting-end cache 3 is described below. In step S81, the transmitting-end terminal device 1 declares, to the transmitting-end cache 3, the content of an SDP file including information associated with content data such as video data included in an electronic mail. In this process, the transmitting-end terminal device 1 uses an ANNOUNCE method of RTSP, described, for example, as follows.
ANNOUNCE rtsp://cacheA/content RTSP/1.0
(content of an SDP file)

Upon receiving the declaration indicating the content of the SDP file, the transmitting-end cache 3 responds, in step S91, to the ANNOUNCE method by supplying an OK message such as that shown below to the transmitting-end terminal device 1.
RTSP/1.0 200 OK Upon receiving the response message described above, the transmitting-end terminal device 1 declares, in step S82, the transfer port number (3058 to 3059 in this specific example) to be used to the transmitting-end cache 3, as shown below.
SETUP rtsp://cacheA/content RTSP/1.0
Transport:RTP/AVP/UDP;unicast;client_port=3058–3059

If the transmitting-end cache 3 receives the declaration about the transfer port, the transmitting-end cache 3 responds, in step S92, to the declaration and declares a transfer port number (5002 to 5003 in this example) to be used by the transmitting-end terminal device 1 as shown below.
RTSP/1.0 200 OK
Tranceport:RTP/AVP/UDP; unicast;client_port=3058–3059
server_port=5002–5003

In the first and second rows, the transmitting-end cache 3 responds to the declaration by the transmitting-end terminal device 1, and, in the third row, the transmitting-end cache 3 declares the transfer port of the transmitting-end cache 3. If the transmitting-end terminal device 1 receives this message, the transmitting-end terminal device 1 requests, in step S83, the transmitting-end cache 3 to store content data, as shown below.
RECORD rtsp://cascheA/content RTSP/1.0

Herein, a RECORD method is a method for requesting storage of content data. In this specific example, "rtsp://cascheA/content" is specified as the address at which the content data should be stored. In step S93, the transmitting-end cache 3 responds to this RECORD method as shown below.

RTSP/1.0 200 OK

If the transmitting-end terminal device 1 receives this response message, the transmitting-end terminal device 1 transmits, in step S84, the video data as the content data to the transmitting-end cache 3 using the transfer port determined in the above process. In this transmission, the transmitting-end terminal device 1 transmits the content data in the form of streaming data using RTP/RTCP. If the transmission of the whole content data is completed, the transmitting-end terminal device 1 transmits, in step S85, an end command to the transmitting-end cache 3 to request the transmitting-end cache 3 to transfer the transmitted content data to the receiving-end cache 6, as shown below.

TEARDOWN rtsp://cacheA/content RTSP/1.0

In step S94, the transmitting-end cache 3 responds to this command. In this case, the response message is similar to that transmitted in step S93 described above. Thus, the content data transfer process performed between the transmitting-end terminal device 1 and the transmitting-end cache 3 is completed.

Figure 12:
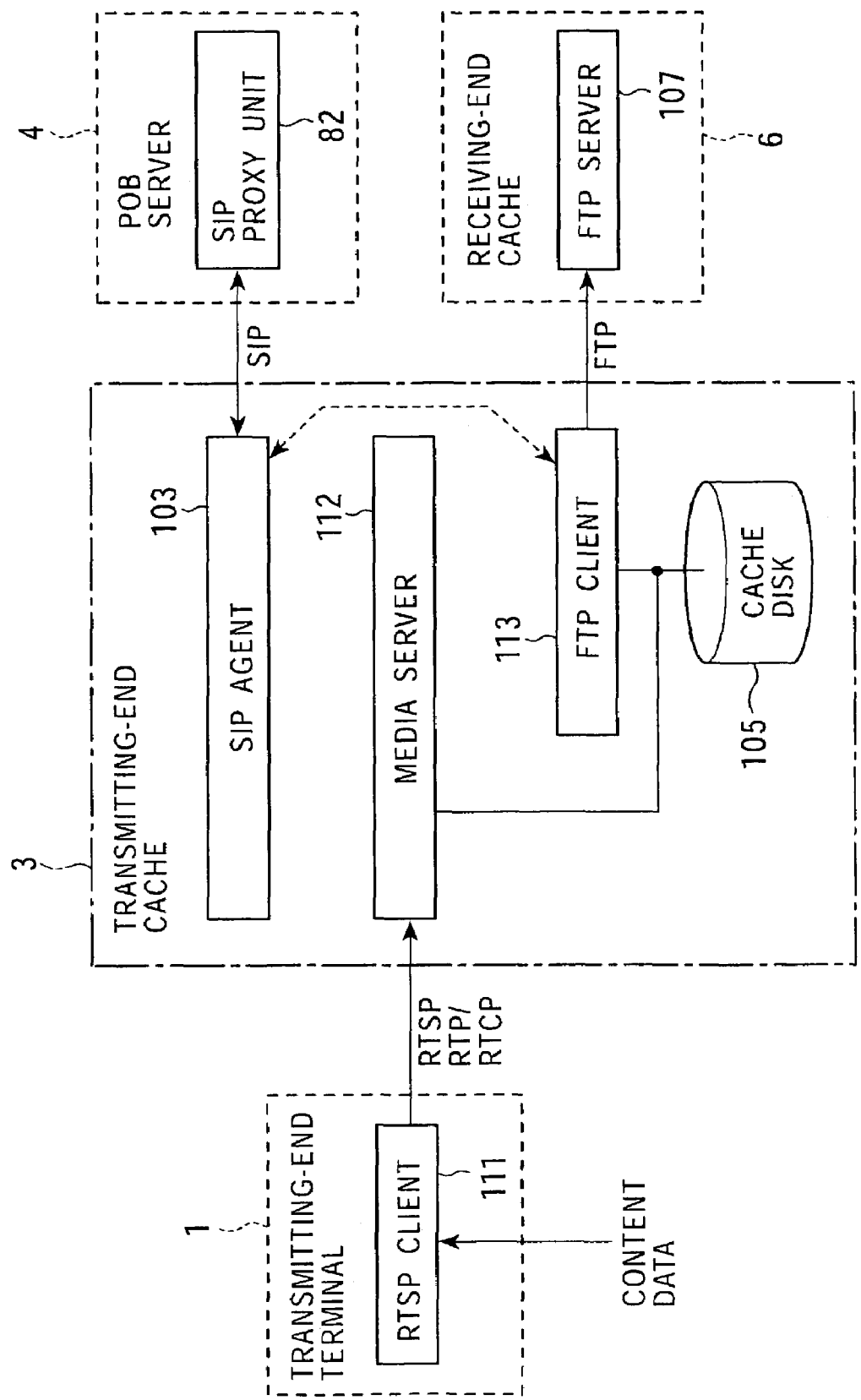
FIG. 12 is a diagram showing another example of the configuration of software installed on the transmitting-end terminal device, the transmitting-end cache, the POB server, and the receiving-end cache.

FIG. 12 shows an example of the configuration of software installed on the transmitting-end terminal device 1, the transmitting-end cache 3, the POB server 4, and the receiving-end cache 6, to perform the above-described process. Similar parts to those described above with reference to FIG. 10 are not described in further detail herein. In FIG. 12, the transmitting-end terminal device 1 includes an RTSP client 111, and the transmitting-end cache 3 includes a media server 112 and an FTP client 113 in addition to the SIP agent 103 and the cache disk 105.

The RTSP client 111 of the transmitting-end terminal device 1 communicates with the media server 112 of the transmitting-end cache 3 to transmit/receive information or a command necessary in transfer of content data. The FTP client 113 of the transmitting-end cache 3 connects itself to the FTP server 107 of the receiving-end cache 6 in accordance with session information established via communication between the SIP agent and the SIP proxy unit 82 of the POB server 4, and the FTP client 113 supplies content data stored in the cache disk 105 to the FTP server 107.

As described above, when the transmitting-end terminal device 1 does not have the SIP agent, transmission of content data from the transmitting-end terminal device 1 to the transmitting-end cache 3 is performed by means of streaming using protocols such as RTSP and RTP/RTCP.

Figure 13:
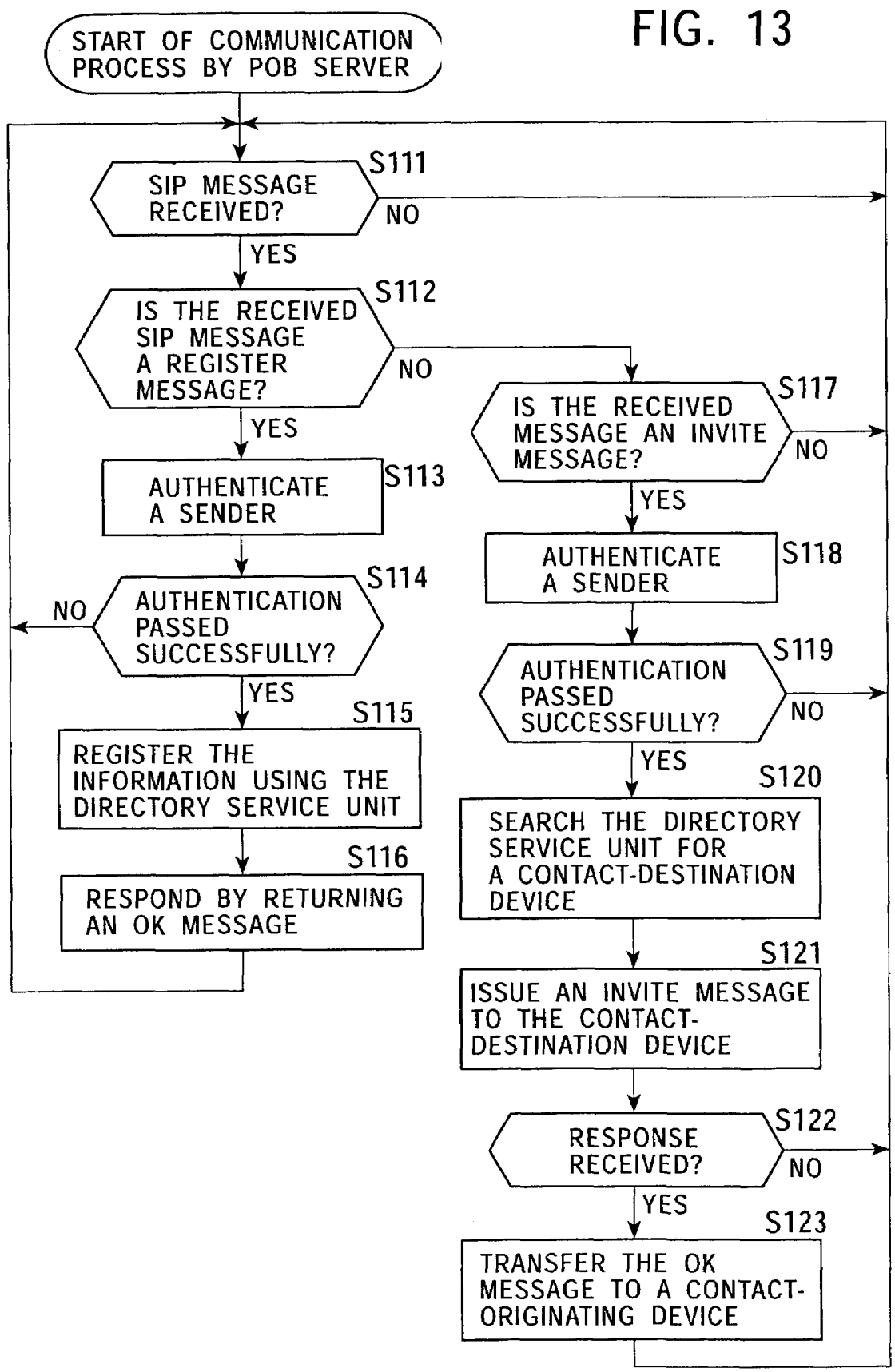
FIG. 13 is a flow chart showing a communication process performed by the POB server.

Now referring to a flow chart shown in FIG. 13, a communication process performed by the POB server 4 to transmit contend data from the transmitting-end terminal device 1 to the transmitting-end cache 3 is described below. First, in step S111, the SIP proxy unit 82 of the POB server 4 determines whether an SIP message has been received. If no SIP message has been received, the process waits until an SIP message has been received. If it is determined that an SIP message has been received, the process proceeds to step S112. In step S112, the SIP proxy unit 82 determines whether the received SIP message is a REGISTER message. If it is determined that the received SIP message is a REGISTER message, the process proceeds to step S113. In step S113, the SIP proxy unit 82 controls the authentication unit 81 to authenticate the sender.

After completion of step S113, the process proceeds to step S114. In step S114, the SIP proxy unit 82 determines whether the user has been successfully authenticated, on the basis of the result of the authentication performed by the authentication unit 81. If it is determined that the user authentication has been successfully passed, the process proceeds to step S115. In step S115, the SIP proxy unit 82 controls the directory service unit 83 to register the acquired location information. More specifically, the location information is registered by the directory service unit 83 into the database 84 and managed by the directory service unit 83. In the next step S116, the SIP proxy unit 82 responds to the REGISTER message and transmits an OK message to the sender of the REGISTER message. After completion of step S116, process returns to S111 and the SIP proxy unit 82 repeats the above-described process from step S111. On the other hand, in a case in which it is determined in step S114 that the user authentication has failed, the process returns to step S111 and the SIP proxy unit 82 repeats the process from step S111.

In a case in which it is determined in step S112 that the received SIP message is not a REGISTER message, the process proceeds to step S117. In step S117, the SIP proxy unit 82 determine whether the received SIP message is an INVITE message. If it is determined that the received SIP message is an INVITE message, the process proceeds to step S118. In step S118, the SIP proxy unit 82 controls the authentication unit 81 to authenticate the sender.

In step S119, the SIP proxy unit 82 determines whether the sender has been successfully authentication, on the basis of the authentication result data received from the authentication unit 81. If it is determined that the sender authentication has been successfully passed, the process proceeds to step S120. In step S120, the SIP proxy unit 82 requests the directory service unit 83 to detect a contacting address for the INVITE message. The directory service unit 83 detects the contacting address on the basis of the address information registered in the database 84 and returns the detection result to the SIP proxy unit 82.

Upon receiving the detection result, the SIP proxy unit 82 issues, in step S121, an INVITE message to the contacting address on the basis of acquired INVITE message. In the next step S122, the SIP proxy unit determines whether a message responding to the issued INVITE message has been received. If the response message has been received, the process proceeds to step S123. In step S123, the SIP proxy unit 82 transfers the OK message received as the response message to the sender of the INVITE message, After completion of step S123, process returns to S111 and the SIP proxy unit 82 repeats the above-described process from step S111.

In a case in which it is determined in step S122 that no message has been received in response to the INVITE message, the process returns to step S111 and the SIP proxy unit 82 repeats the process from step S111. Also in the case in which it is determined in step S119 that the sender authentication has failed, the process returns to step S111 and the SIP proxy unit 82 repeats the process from step S111. In a case in which it is determined in step S117 that the received SIP message is not an INVITE message, the process returns to step S111 and the SIP proxy unit 82 repeats the process from S111.

The communication process performed by the POB server 4 has been described above. Now, a method of supplying the electronic mail including video data, which has been supplied from the transmitting-end terminal device 1 to the transmitting-end cache 3 and is retained in transmitting-end cache 3, to the receiving-end cache 6 is described.

Figure 14:
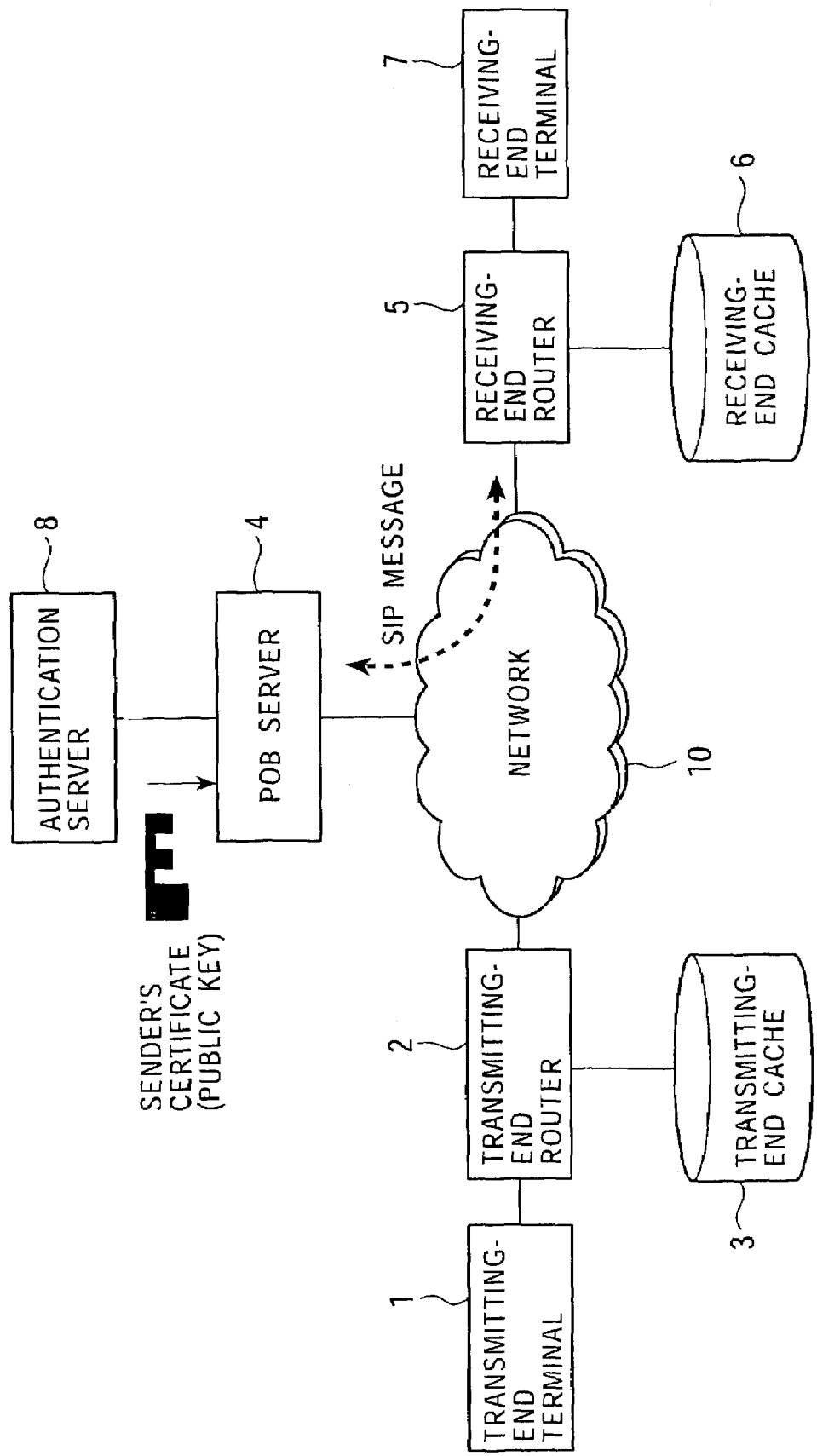
FIG. 14 is a diagram showing a manner in which the POB server authenticates a sender and a manner in which the POB server determines whether the receiving-end terminal device can receive an electronic mail.

FIG. 14 is a diagram showing a process of authenticating the user of the transmitting-end terminal device 1 who has issued a request for transmission via the POB server 4, and also showing a process of determining whether the receiving-end terminal device 7 can receive the electronic mail. The POB server 4, which has received the message indicating a request for transmission of the electronic mail from the transmitting-end terminal device 1, as shown in FIG. 8, the SDP file including information associated with the video data included in the electronic mail, and the digital signature data produced by the transmitting-end terminal device 1, acquires a certificate including a public key of the sender registered in the authentication server 8 from the authentication server 8 and authenticates, using the authentication unit 81, the digital signature data received from the transmitting-end terminal device 1.

In accordance with the message received from the transmitting-end terminal device 1 and indicating the request for transmission of the electronic mail, the POB server 4 supplies the SDP file including information associated with the video data included in the electronic mail to the receiving-end router 5 and determines whether the receiving-end terminal device 1 can receive the electronic mail. If the POB server 4 has successfully authenticated the sender and if the receiving-end router 5 has determined that the receiving-end terminal device 7 can receive the electronic mail, the receiving-end router 5 transmits a message to the POB server 4 to inform that the electronic mail is acceptable.

Figure 15:
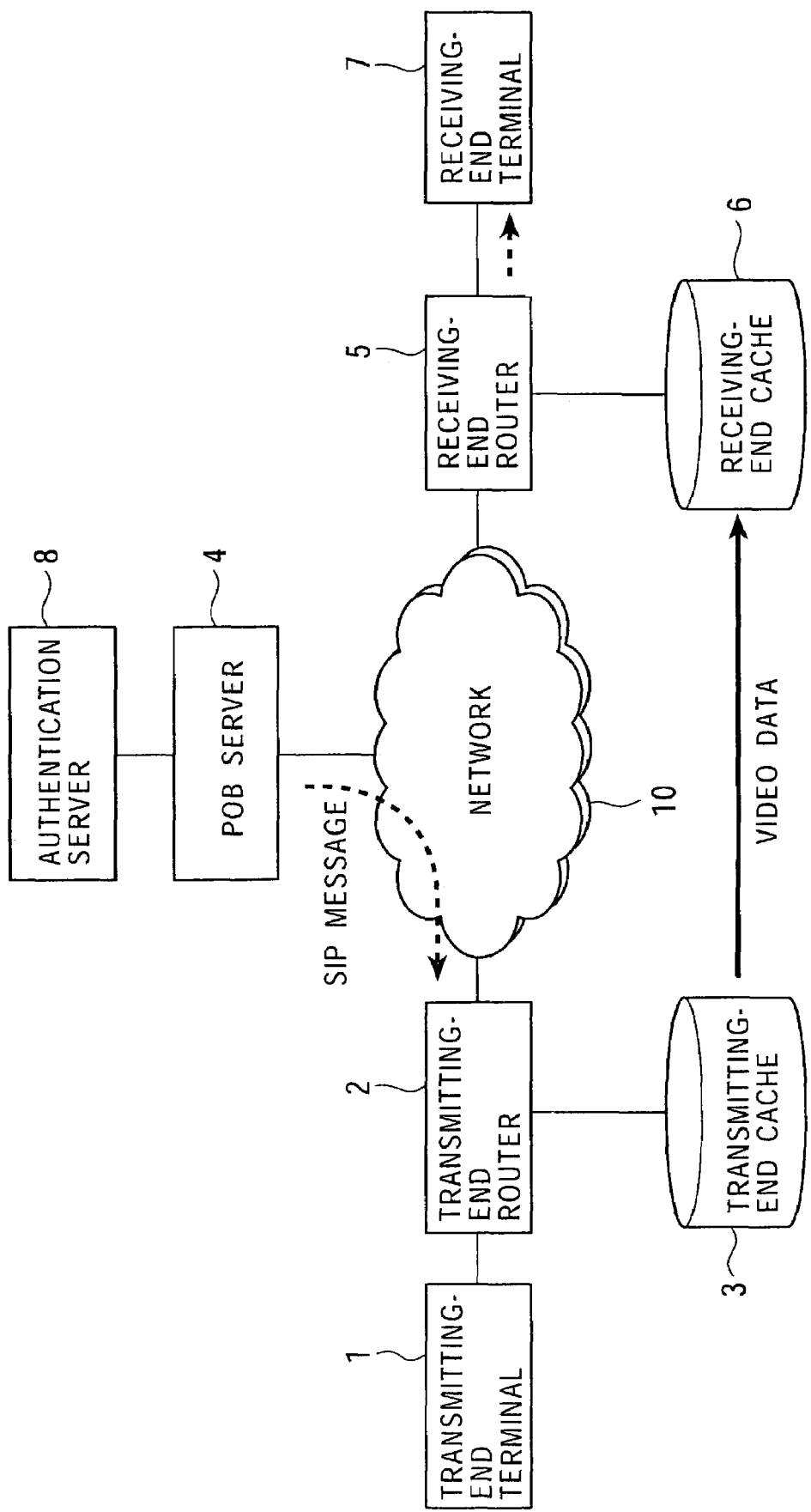
FIG. 15 is a diagram showing a process in which the POB server transmits a message, indicating whether transmission is permitted, to the transmitting-end router, and then the transmitting-end cache transmits electronic mail data including video data to the receiving-end cache.

FIG. 15 is a diagram showing a process performed by the POB server 4 to transmit a message, indicating whether transmission is permitted, to the transmitting-end router 2, and also showing a process performed by the transmitting-end cache 3 to, in response to the message, transmit the electronic mail data to the receiving-end cache 6. If the authentication of the sender performed by the POB server 4 is successful and if it is determined that the receiving-end terminal device 7 can receive the electronic mail, the POB server 4 transmits a message to the transmitting-end router 2 to inform that transmission of the electronic mail is permitted. In response, the transmitting-end cache 3 transmits the electronic mail data including the video data retained in the transmitting-end cache 3 to the receiving-end cache 6 via the network 10. In this case, the electronic mail data is directly supplied from the transmitting-end cache 3 to the receiving-end cache 6 without being passed through the POB server 4.

Upon receiving the electronic mail data, the receiving-end cache 6 stores the received electronic mail data and transmits a message (electronic mail or the like) to the receiving-end terminal device 7 to inform that the electronic mail data has arrived. The manner in which the transmitting-end cache 3 transmits the electronic mail data including the video data to the receiving-end cache 6 has been described.

Figure 16:
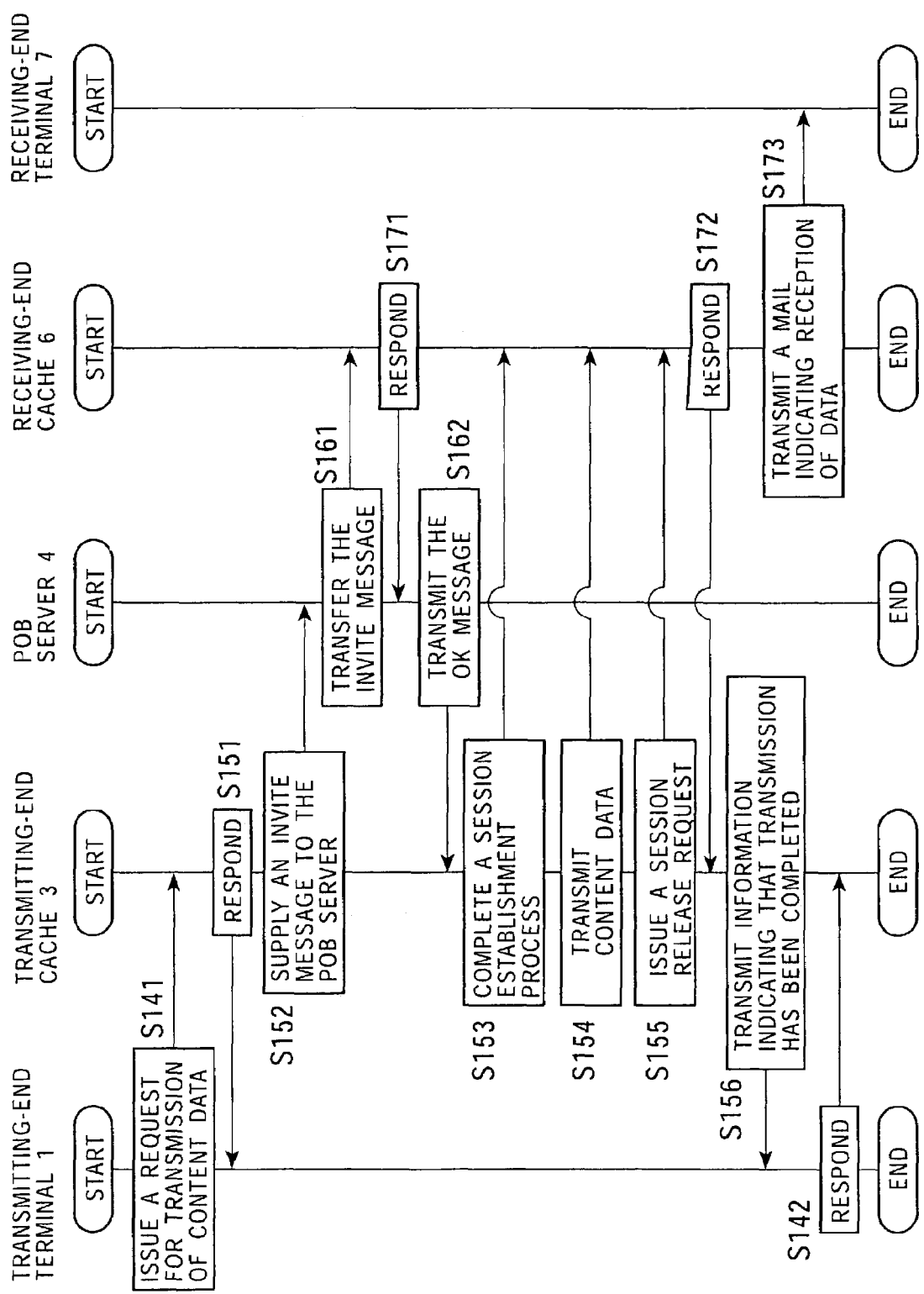
FIG. 16 is a flow chart showing a communication process performed in an electronic mail transmission system according to the present invention.

Now, referring to a flow chart shown in FIG. 16, the process performed by the transmitting-end terminal device 1, the transmitting-end cache 3, the POB server 4, the receiving-end cache 6, and the receiving-end terminal device 7 are described in further detail below. First, in step S141, the transmitting-end terminal device 1 transmits a REFER message shown below to the transmitting-end cache 3 to request the transmitting-end cache 3 to transmit as the content data the video data stored in the transmitting-end cache 3.
REFER sip:content@cacheA.ssss.com SIP/2.0
From:sip:userA@ssss.com
To:sip:content@cacheA.ssss.com
Refer-To:sip:userB@ssss.com?Accept-Contact="*; feature=pobox"
Contact:sip:userA@terminalA.ssss.com The REFER message transmitted from the transmitting-end terminal device 1 to the transmitting-end cache 3 serves as a trigger which causes the transmission to start. In this REFER message, content data to be transmitted is specified in the first row, and a destination is specified in the fourth row. "content@cacheA.ssss.com" denotes the address of the content data stored in the transmitting-end cache 3, and "userB@ssss.com" denotes the address of the destination, that is, the address of the user of the receiving-end terminal device 7.

Upon receiving the REFER message, in step S151, the transmitting-end cache 3 responds to the REFER message by issuing a response message as shown below.
SIP/2.0 202 Accepted
From:sip:userA@ssss.com
To:sip:content@cacheA.ssss.com
Contact:sip:content@cacheA.ssss.com;feature=pobox In this response message, it is described in the first row that the request described in the REFER message issued by the transmitting-end terminal device 1 has been accepted. In step S152, the transmitting-end cache 3 transmits an INVITE message shown below to the POB server 4.
INVITE sip:userB@ssss.com SIP/2;0
From:sip:userA@cacheA.ssss.com
To:sip:userB@ssss.com
Accept-Contact:*;feature=pobox;only=true
Referred-By:sip:userA@ssss.com
Contact:sip:content@cacheA.ssss.com;feature=pobox This INVITE message from the transmitting-end cache 3 to the POB server 4 indicates that use of the POB-like capability of the receiver "userB@ssss.com" is requested. Upon receiving the INVITE message, the POB server 4 checks the directory service unit 83 to detect the contacting device (contacting address) of "userB@ssss.com", which has been registered in the manner described earlier with reference to FIG. 5. In this specific example, the receiving-end cache 6 (userB@cacheB.ssss.com) is detected as the contacting device (contacting address) of "userB@ssss.com". In steps S161, in accordance with the detection result, the received INVITE message is rewritten as shown below and transferred to the receiving-end cache 6. Note that because the location information associated with the receiving devices is stored in the directory service unit 83 as described earlier with reference to FIG. 5, any message addressed to the receiving-end terminal device 7 is supplied to the receiving-end cache 6.
INVITE sip:userB@cacheB.ssss.com SIP/2.0
To:sip:userB@ssss.com
From:sip:userA@cacheA.ssss.com
Accept-Contact:*;feature=pobox;only=true
Referred-By:sip:userA@ssss.com
Contact:sip:content@cacheA.ssss.com;feature=pobox In the first row of this INVITE message, the destination address has been changed from the receiving-end terminal device 7 to the receiving-end cache 6. Upon receiving this INVITE message, the receiving-end cache 6 checks the load state and the available disk storage space and evaluates the receiving ability of the receiving-end terminal device 7 on the basis of the content of the received SDP file to determine whether the receiving-end terminal device 7 can receive the electronic mail data. The information indicating the receiving ability of the receiving-end terminal device 7 is managed by the receiving-end cache 6 and may include information about, for example, a time zone in which receiving is possible. If the available time zone is specified, the determination on whether the receiving-end terminal device 7 can receive the electronic mail data is made taking into account the available time zone. More specifically, as shown in FIG. 6, the available time zone is described, for example, as "download time=2–7" in a preference field in which the receiving ability of the terminal is described. In this specific example, downloading is possible in a time zone from 2 a.m. to 7 a.m. If it is determined that receiving is possible judging from all items, the receiving-end cache 6 responds, in step S171, to the INVITE message as follows.

SIP/2.0 200 OK
To:sip:userB@ssss.com
From:sip:userA@cacheA.ssss.com
Contact:sip:content@cacheB.ssss.com;feature=pobox In this response message, it is described in the first row that receiving of the content data is possible. Upon receiving this response message, the POB server 4 transmits, in step S162, an OK message to the issuer of the INVITE message, that is, the transmitting-end cache 3. The OK message transmitted herein to the transmitting-end cache 3 is similar to that supplied to the POB server 4, and thus it is not described herein in further detail.

If the transmitting-end cache 3 receives the OK message, the transmitting-end cache 3 transmits, in step S153, an ACK message as shown below, thereby establishing the session.

ACK sip:content@cacheB.ssss.com SIP/2.0
To:sip:userB@ssss.com
From:sip:userA@cacheA.ssss.com
Contact:sip:content@cacheA.ssss.com;feature=pobox In the next step S154, the transmitting-end cache 3 transmits the content data stored therein to the receiving-end cache 6 using the FTP as shown in below.

FTP cacheB.ssss.com
put content

In the first row, the transmitting-end cache 3 connects itself with the receiving-end cache 6 and, in the second row, the transmitting-end cache 3 transmits (uploads) "content", that is, the content data. After completion of the transmission of the content data, the transmitting-end cache 3 transmits, in step S155, a BYE message such as that shown below to the receiving-end cache 6 to request releasing of the session.

BYE sip:content@cacheB.ssss.com SIP/2.0
From:sip:userA@cacheA.ssss.com
To:sip:userB@ssss.com In response to the BYE message, the session established by the INVITE message is released. More specifically, if the receiving-end cache 6 receives the BYE message, the receiving-end cache 6 releases the session and responds, in step S172, to the BYE message by transmitting a response message to the transmitting-end cache 3 as shown below.

SIP/2.0 200 OK
To:sip:userB@ssss.com
From:sip:userA@cacheA.ssss.com

Upon receiving this response message, the transmitting-end cache 3 transmits, in step S156, a message shown below to the transmitting-end terminal device 1 to inform that the transmission has been completed.

NOTIFY sip:userA@terminalA.ssss.com SIP/2.0
From:sip:userA@cacheA.ssss.com
To:sip:userA@ssss.com
Event refer This NOTIFY message corresponds to the REFER message transmitted in step S141 from the transmitting-end terminal device 1 as can be seen from the description in the fourth row, "Event:refer". In response to this NOTIFY message, the transmitting-end terminal device 1 transmits, in step S142, a response message shown below to the transmitting-end cache 3.

SIP/2.0 200 OK
To:sip:userA@cacheA.ssss.com
From:sip:userA@ssss.com

On the other hand, after the receiving-end cache 6 transmits, in step S172, the response message in response to the BYE message, the receiving-end cache 6 transmits, in step S173, a notification indicating that the content data has been received to the receiving-end terminal device 7 by means of an electronic mail or the like.

The manner in which the transmitting-end cache 3 transmits the electronic mail including the video data to the receiving-end cache 6 has been described above. The reception notification in the form of the electronic mail, transmitted from the receiving-end cache 6 to the receiving-end terminal device 7, includes data indicating the link path to the electronic mail including the video data, and thus the user of the receiving-end terminal device 7 can access the video data stored in the receiving-end cache 6 in accordance with the link path described in the reception notification and can download the video data.

Figure 17:
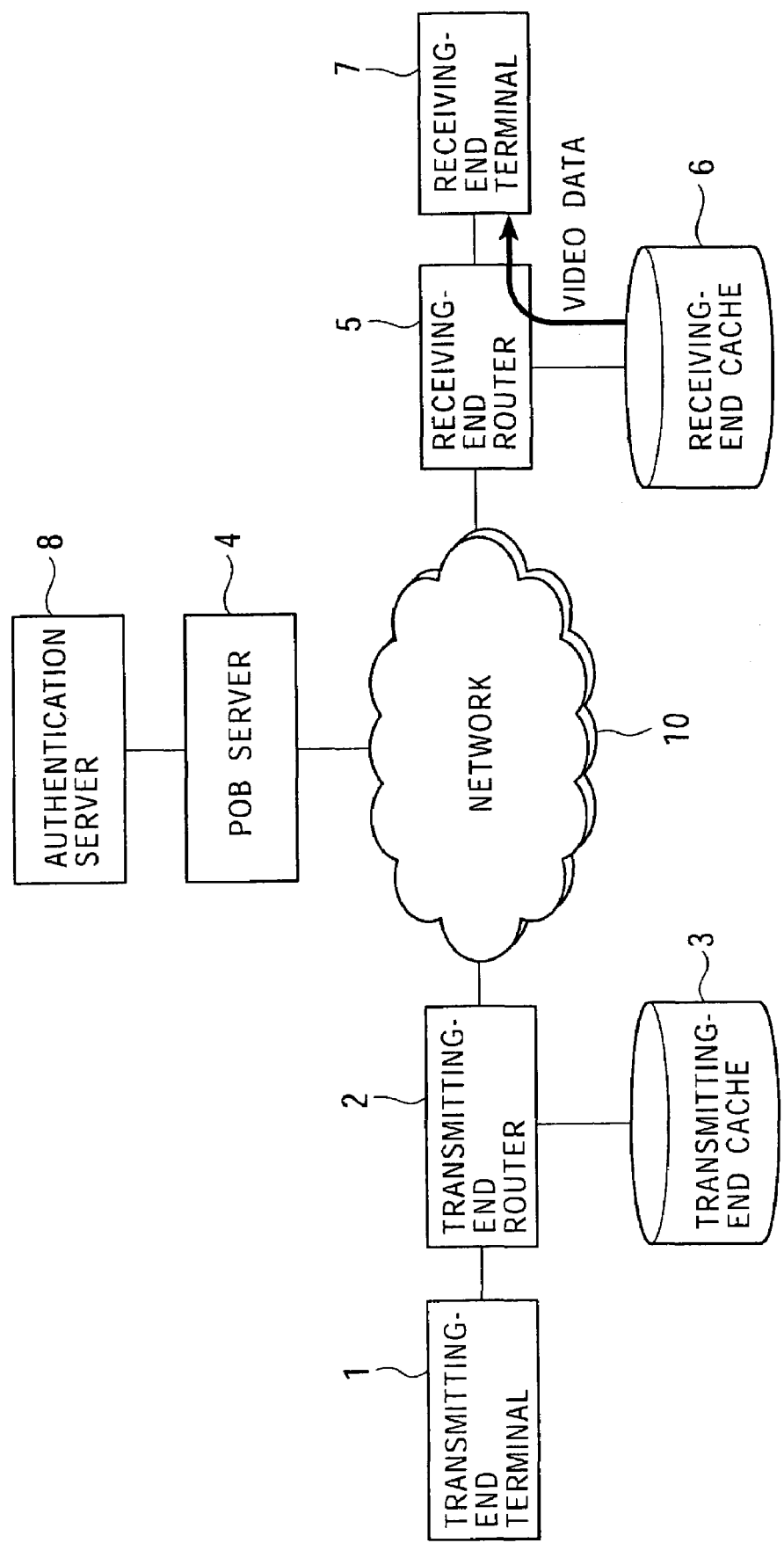
FIG. 17 is a diagram showing a manner in which electronic mail data including the video data stored in the receiving-end cache is supplied to the receiving-end terminal device.

FIG. 17 is a diagram showing a manner in which the electronic mail data including the video data stored in the receiving-end cache 6 is supplied to the receiving-end terminal device 7. In FIG. 17, if, in accordance with an operation perform by the user of the receiving-end terminal device 7, the receiving-end terminal device 7 access the link disposed in the reception notification in the form of the electronic mail received from the receiving-end cache 6, RTSP client software installed on the receiving-end terminal device 7 is activated and communication with the media server in the receiving-end cache 6 starts.

The video data stored in the receiving-end cache 6 is transmitted to the receiving-end terminal device 7 by means of RTP/RTCP streaming via the port with the port number specified in the RTSP communication. The user of the receiving-end terminal device 7 can view the video data using the viewer disposed in the receiving-end terminal device 7. In the above process, the transmission of the video data from the receiving-end cache 6 to the receiving-end terminal device 7 may also be performed by means of file transfer using the FTP.

Figure 18:
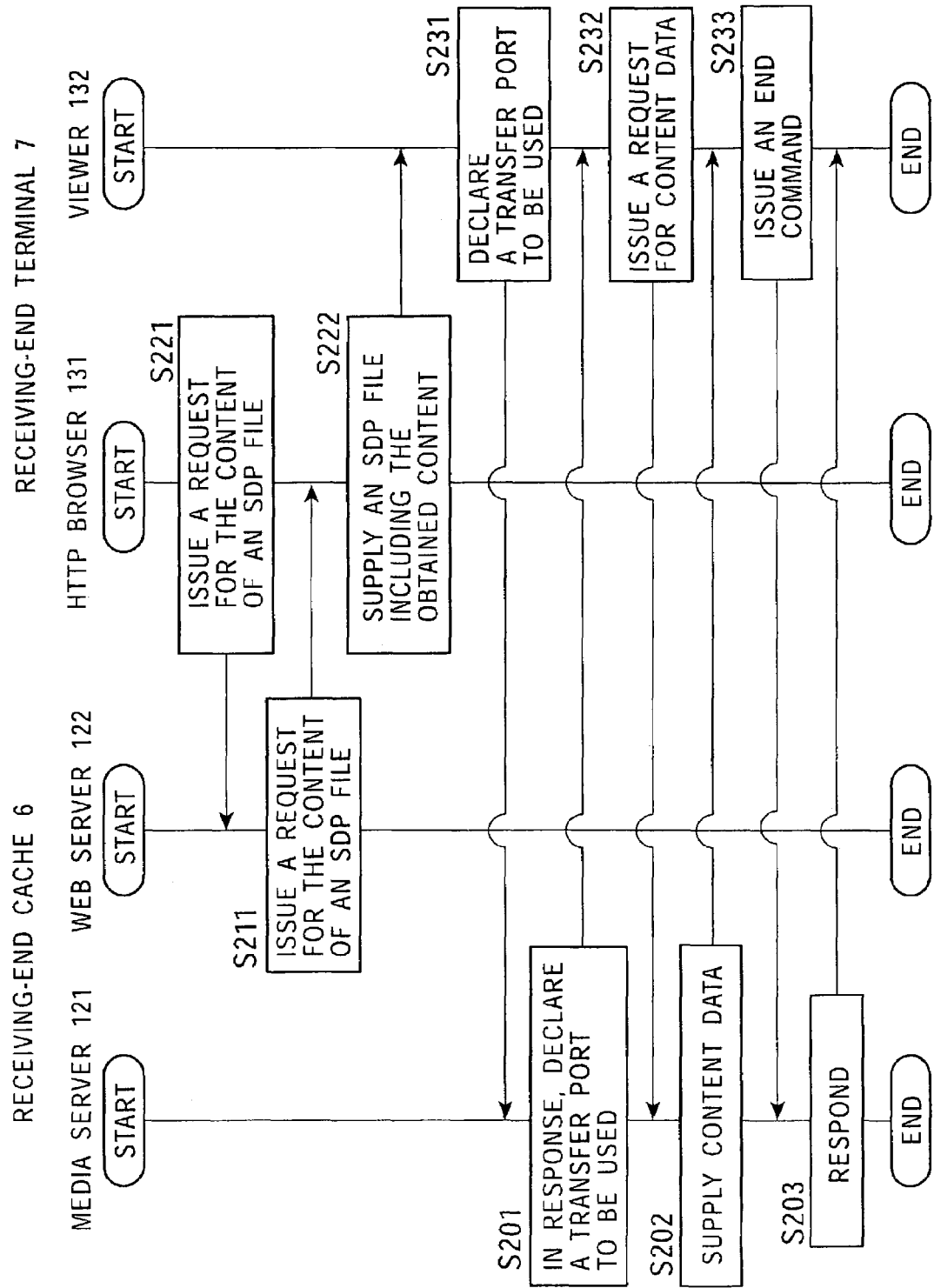
FIG. 18 is a flow chart showing a process in which content data is transmitted by means of streaming between the receiving-end cache and the receiving-end terminal device.

Referring now to a flow chart shown in FIG. 18, a process associated with the transmission and the reception of the content data between the receiving-end cache 6 and the receiving-end terminal device 7 is described below. Herein, it is assumed that the media server 121 managing the content data and the WEB server 122 managing information associated with the content data are operating in the receiving-end cache 6, and it is also assumed that the HTTP (Hyper Text Transfer Protocol) browser 131 for acquiring the content data and the viewer 132 for displaying the acquired content data are operating in the receiving-end terminal device 7.

First, in step S221, in response to a command issued by the user, the HTTP browser 131 of the receiving-end terminal device 7 requests the WEB server 122 of the receiving-end cache 6 to supply data indicating the content of the SDP file including information associated with the content data, by means of HTTP as shown below.

GET/content.sdp HTTP/1.1

"content.sdp" denotes the SDP file of the content data. In step S211, in response to the request, the WEB server 122 transmits data indicating the content of the SDP file of the video data stored in the WEB server 122 to the HTTP browser 131 as shown below.

HTTP/1.0 200 OK
(content of the sdp file)

That is, in response to the GET message, the WEB server 122 returns an OK message together with data indicating the content of the SDP file. In step S222, upon receiving the data indicating the content of the SDP file from the WEB server 122, the HTTP browser 131 supplies the SDP file with the acquired content to the viewer 132 for dealing with the content data.

In step S231, upon receiving the SDP file, the viewer 132 declares the transfer port to be used in receiving the video data, to the media server 121, for dealing with content data, disposed in the receiving-end cache 6, as shown below.
SETUP rtsp://cacheB/content RTSP/1.0
Transport:RTP/AVP/UDP:unicast;client_port=3058–3059

In this declaration, it is described in the first row that the video data stored in the receiving-end cache 6 is to be acquired by means of RTSP streaming. In the second row, the transfer port to be used is specified. More specifically, "rtsp://cacheB/content" specifies the video data stored in the receiving-end cache 6, and "client_port=3058–3059" specifies the transfer port number of the receiving-end terminal device 7 to be used.

In step S201, in response to receiving the above declaration, the media server 121 declares the transfer port number to be used in transmission of the video data as shown below.
RTSP/1.0 200 OK
Transport: RTP/AVP/UDP;unicast;client_port=3058–3059; server_port=5002–5003

In this declaration, the response to the message received from the viewer 132 is described in the first and second rows. In the third row, "server_port=5002–5003" indicates the transfer port number to be used by the media server. In step S232, upon receiving the declaration, the viewer 132 requests the media server 121 to supply the video data as the content data, as shown below.
PLAY rtsp://cacheB/content RTSP/1.0

This PLAY method is a message requesting streaming the video data. In step S202, in response to receiving the request, the media server 121 supplies the video data as the content data to the viewer 132 of the receiving-end terminal device 7 by means of streaming, as shown below.
RTSP/1.0 200 OK Because the video data to be supplied by means of streaming has been already stored in the receiving-end cache 6, the receiving-end cache 6 can receive the stream of video data regardless of the load status or the bandwidth of the external network 10. This ensures the viewer 132 to play back the content in a highly reliable fashion.

If a command is issued by the user of the receiving-end terminal device 7 or if the playing back of the content is completed, then, in step S233, the viewer 132 issues a content data transmission end command to the media server 121 as shown below.
TEARDOWN rtsp://cacheB/content RTSP/1.0

Figure 19:
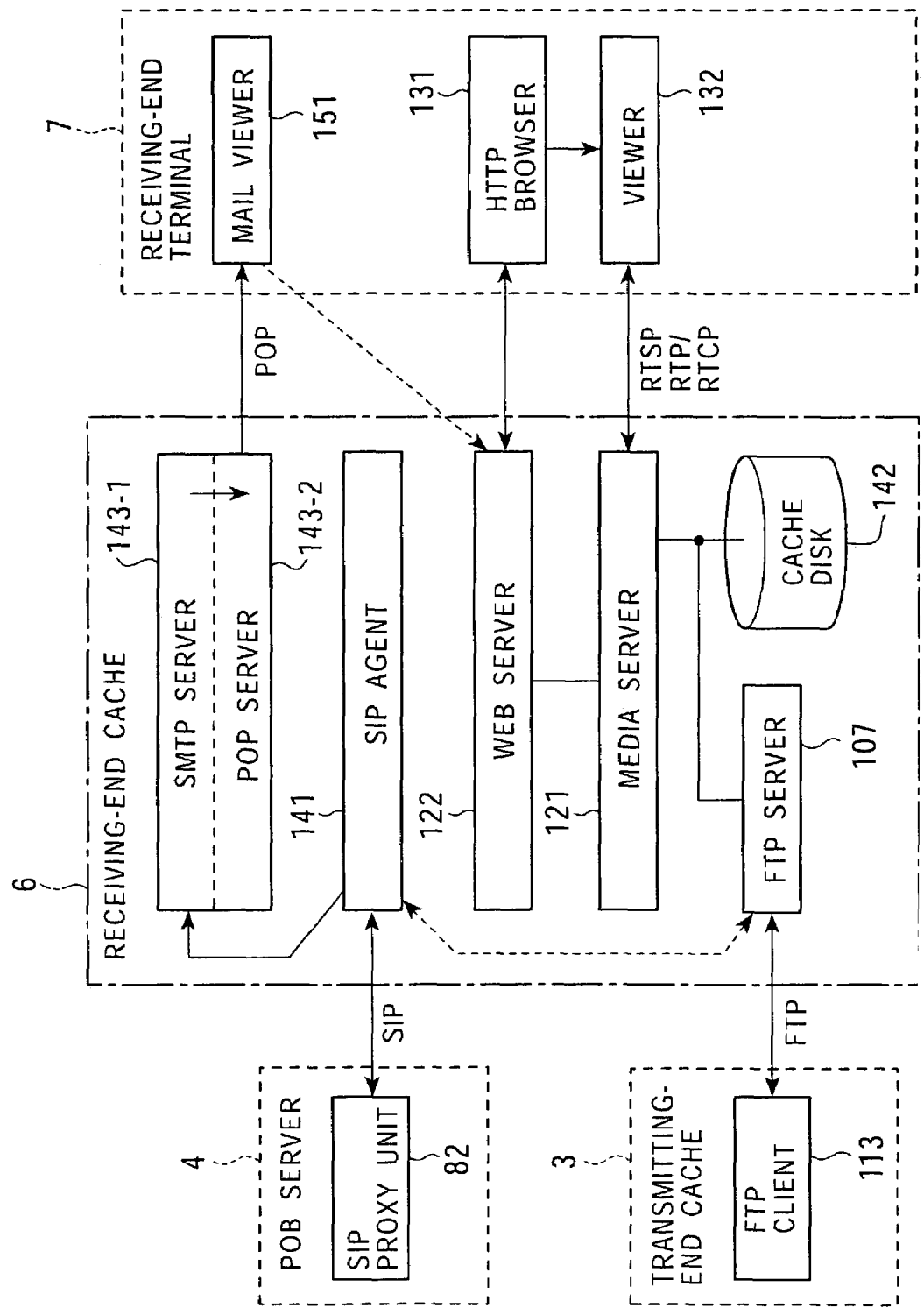
FIG. 19 shows an example of the configuration of software installed on the transmitting-end cache, the POB server, the receiving-end cache, and the receiving-end terminal device so as to be capable of transmitting data by means of streaming to the receiving-end terminal device.

In step S203, in response to receiving the transmission end command, the media server 121 ends the streaming of the video data as shown below.
RTSP/1.0 200 OK FIG. 19 shows an example of the configuration of software installed on the transmitting-end cache 3, the POB server 4, the receiving-end cache 6, and the receiving-end terminal device 7, to perform the above-described process. In FIG. 19, similar parts to those described earlier with reference to FIG. 10 or 12 are not described again herein.

In FIG. 19, the receiving-end cache 6 includes, in addition to the FTP server 107, the media server 121, the WEB server 122, an SIP agent 141, a cash disk 142, an SMTP (Simple Mail Transfer Protocol) server 143-1, and a POP (Post Office Protocol) server 143-2. The receiving-end terminal device 7 includes the HTTP browser 131, the viewer 132, and a mail viewer 151.

The SIP agent 141 of the receiving-end cache 6 communicates with the SIP proxy unit 82 of the POB server 4 to transmit/receive a command or information associated with the transmission/reception of the electronic mail including the video data. If the video data is supplied from the FTP client 113 of the transmitting-end cache 3 to the FTP server 107 and the video data is stored on the cache disk 142, the SIP agent 141 notifies the SMTP server 143-1 of completion of receiving the video data. The SMTP server 143-1 retains this reception notification mail. If the mail viewer 151 of the receiving-end terminal device 7 accesses the POP server 143-2, the SMTP server 143-1 supplies the reception notification mail retained therein to the mail viewer 151 via the POP server 143-2.

If the mail viewer 151 of the receiving-end terminal device 7 receives the electronic mail including the reception notification, the mail viewer 151 displays the electronic mail on a display. If a user issues a command to access the link to the video data, included in the electronic mail, the HTTP browser 131 communicates with the WEB server 122 and accesses the linked device. The HTTP browser 131 requests supplying data indicating the content of the SDP file of the content data, that is, the video data. In response, the WEB server 122 supplies the content of the requested SDP file to the HTTP browser 131.

The HTTP browser 131 supplies the acquired content of the SDP file to the viewer 132. Upon receiving the SDP file, the viewer 132 requests the media server 121 to supply the video data. The media server 121 acquires the requested video data from the cache disk 142 and supplies it to the viewer 132 by means of streaming using RTP/RTCP.

As described above, when the receiving-end terminal device 7 does not have an SIP agent, transmission of content data from the receiving-end cache 6 to the receiving-end terminal device 7 is performed by means of streaming using file transfer protocols such as RTSP and RTP/RTCP. In a case in which the receiving-end terminal device 7 has an SIP agent capability, transmission of content data from the receiving-end cache 6 to the receiving-end terminal device 7 may be performed using a file transfer protocol such as the FTP.

Figure 20:
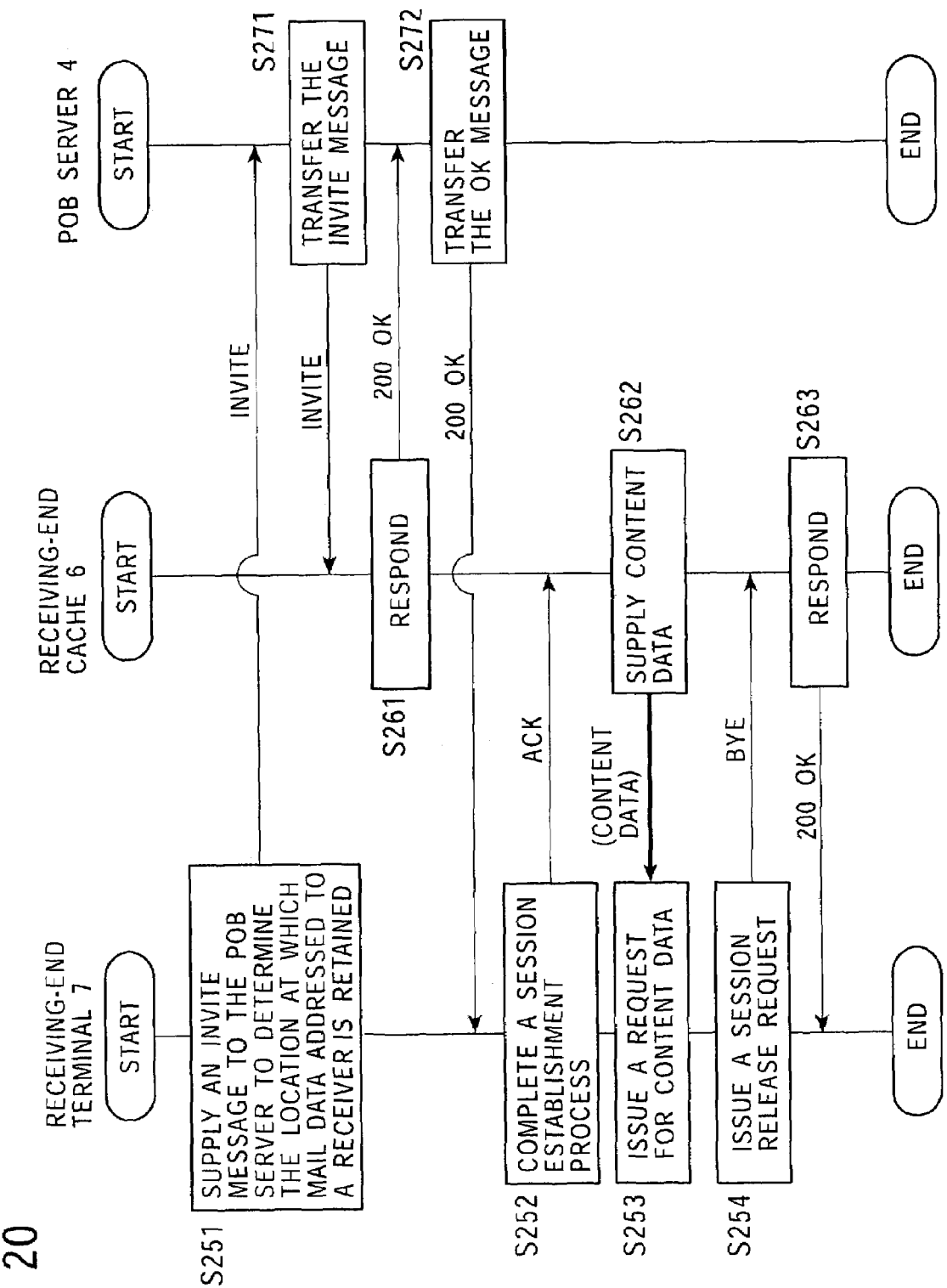
FIG. 20 is a flow chart showing a process in which electronic mail data including video data is supplied from the receiving-end cache to the receiving-end terminal device using the FTP.

Referring now to a flow chart shown in FIG. 20, a process in which the electronic mail data including the video data is supplied from the receiving-end cache 6 to the receiving-end terminal device 7 is described below. First, in step S251, to detect the location at which the POB capability of the user "userB" is implemented, the receiving-end terminal device 7 transmits an INVITE message to the POB server 4. The INVITE message is described, for example, as shown below.
INVITE sip:userB@ssss.com SIP/2.0
From:sip:userB@ssss.com
To:sip:userB@ssss.com
Accept-Contact:*;feature=pobox;
Contact:sip:content@terminalB.ssss.com This INVITE message is a message transmitted by the receiving-end terminal device 7 to the POB server 4 to request establishment of a session in which the receiving-end terminal device 7 receives content data "content" from the POB of the user "userB". In response to receiving the INVITE message, the POB server 4 determines the address of the receiving-end cache 6 registered, in FIG. 5, as the contacting device. In the fifth row of the INVITE message, address information associated with the content data to be transmitted is described. In this specific case, the content name of the content data is "content".

In step S271, upon receiving the INVITE message, the POB server 4 transfers the received INVITE message to the receiving-end cache 6 detected as the contacting device. Before the INVITE message is transferred, it is rewritten as shown below.
INVITE sip:userB@cacheB.ssss.com SIP/2.0
From:sip:userB@ssss.com
To:sip:userB@ssss.com
Accept-Contact:*;feature=pobox;
Contact:sip:content@terminalB.ssss.com In the first row, the destination of the INVITE message is rewritten from "sip:userB@ssss.com" to "sip:userB@cacheBssss.com" to indicate that the INVITE message should be transferred to the receiving-end cache 6. In step S261, upon receiving the INVITE message, the receiving-end cache 6 returns a response message shown below to the issuer of the INVITE message, that is, the POB server 4, if the receiving-end cache 6 can respond to the session establishment request.
SIP/2.0 200 OK
To:sip:userB@ssss.com
From:sip:userB@ssss.com
Contact:sip:content@cacheB.ssss.com;feature=pobox In this response message, it is described in the first row that the message is an OK message. This OK message is supplied to the POB server 4. In step S272, the POB server 4 transfers the received response message to the issuer of the INVITE message, that is, the receiving-end terminal device 7. This response message is similar to the above response message, and thus it is not described herein in further detail.

In step S252, upon receiving the response message, the receiving-end terminal device 7 transmits an ACK message shown below to the original issuer of the response message, that is, the receiving-end cache 6, thereby completing the session establishment process.
ACK sip:content@cacheB.ssss.com SIP/2.0
To:sip:userB@ssss.com
From:sip:userB@ssss.com
Contact:sip:content@cacheB.ssss.com;feature=pobox The ACK message corresponds to the INVITE message and serves to finish the process of establishing the session started by the INVITE message. In the first row of the ACK message, it is described that the ACK message should be supplied to the receiving-end cache 6.

After the receiving-end cache 6 has received the ACK message, in step S253, the receiving-end terminal device 7 requests the receiving-end cache 6 to supply the content data. In step S262, the receiving-end cache 6 transmits electronic mail data including the video data as the requested content data to the receiving-end terminal device 7 using, for example, the FTP. In step S254, after completion of supplying the content data, the receiving-end terminal device 7 transmits a BYE message described as shown below to the receiving-end cache 6 to request releasing of the session.
BYE sip:content@cacheB.ssss.com SIP/2.0
To:sip:userB@ssss.com
From:sip:userB@ssss.com This BYE message is a message transmitted from the receiving-end terminal device 7 to the receiving-end cache 6 to release the session. In the first row of this BYE message, it is described that the BYE message should be supplied to the receiving-end cache 6. Upon receiving the BYE message, the receiving-end cache 6 transmits a response message described as shown below to the receiving-end terminal device 7.
SIP/2.0 OK
To:sip:userB@ssss.com
From:sip:userB@ssss.com Upon receiving the response message, the receiving-end terminal device 7 ends the process of receiving the video data from the receiving-end cache 6. Although in the above example, the content name, that is, the name of the video data stored in the receiving-end cache 6, is "content", the content name is not limited that but an arbitrary content name may be employed.

FIG. 21 shows an example of the configuration of software installed on the transmitting-end cache 3, the POB server 4, the receiving-end cache 6, and the receiving-end terminal device 7, to perform the above-described process. Similar parts to those described above with reference to FIG. 10, 12, or 19 are not described herein again. In FIG. 21, the receiving-end cache 6 includes the FTP server 107, the SIP agent 141, the cache disk 142, the SMTP server 143-1, and the POP server 143-2. The receiving-end terminal device 7 includes the viewer 132 for viewing contents, the mail viewer 151, the SIP agent 161, and the FTP client 162.

The SIP agent 141 of the receiving-end cache 6 communicates with the SIP proxy unit 82 of the POB server 4 to transmit/receive a command or information associated with the file transfer performed by the FTP server 107. The SIP agent 141 communicates with the SIP agent 161 of the receiving-end terminal device 7 via the SIP proxy unit 82 of the POB server 4 to transmit/receive a command or information associated with the file transfer performed by the FTP server 107.

In accordance with a command issued by the SIP agent 141, the FTP server 107 acquires video data from the FTP client 113 using the FTP and stores the acquired video data in the cache disk 142. If the FTP server 107 acquires the video data, the SIP agent 141 informs the SMTP server 143-1 that the video data has been acquired. In response, the SMTP server 143-1 transmits a reception notification mail to the user "userB". As a result, the reception notification mail is transferred to the POP server 143-2.

If the mail viewer 151 accesses the POP server 143-2 in accordance with an operation performed by the user, an electronic mail including the reception notification is transmitted from the POP server 143-2 to the mail viewer 151. On the basis of the hyperlink information associated with "content" described in the electronic mail, the SIP agent 161 of the receiving-end terminal device 7 queries the SIP proxy unit 82 for the location at which the "content" data is stored. Because the receiving-end cache 6 has been registered as the contacting device in the SIP proxy unit 82, as described earlier with reference to FIG. 5, the SIP agent 141 of the receiving-end terminal device 7 accesses the SIP agent of the receiving-end cache 6 and a session is established between them.

In accordance with the result of the communication performed by the SIP agent 161, the FTP client 162 accesses the FTP server 107 and acquires the video data stored on the cache disk 142 by means of file transfer using the FTP. The acquired video data is stored in the form of a file. If a request for viewing the video data is issued by the viewer 132, the video data is supplied to the viewer 132 and played back. The content data stored in the receiving-end cache 6 can be supplied to the receiving-end terminal device 7 not only by means of streaming but also by means of file transfer using the FTP.

Although in the embodiments described above, an electronic mail including large-size data such as video data is transmitted from the transmitting-end terminal device 1 to the receiving-end terminal device 7, there is no particular restriction on the data transmitted from the transmitting-end terminal device 1 to the receiving-end terminal device 7, and any data can be transmitted.

When the processing sequence is executed by software, a program forming the software may be installed from a storage medium or via a network onto a computer which is provided as dedicated hardware or may be installed onto a general-purpose computer capable of performing various processes in accordance with various programs installed thereon.

Specific examples of storage media usable for the above purpose include, as shown in FIG. 2, a magnetic disk 61 (such as a floppy disk), an optical disk 62 (such as a CD-ROM (Compact Disk-Read Only Memory) and a DVD (Digital Versatile Disk)), a magneto optical disk 63 (such as an MD (Mini-Disc)), and a semiconductor memory 64, in the form of a package medium including a program stored thereon which is supplied to a user separately from a computer. A program may also be supplied to a user together with a computer including a built-in ROM or the like, in which the program has been preinstalled, of a CPU 31.

In the present description, the steps described in the program stored in the storage medium may be performed either in time sequence in accordance with the order described in the program or in a parallel or separate fashion. In the present description, the term "system" is used to represent an entire set of apparatuses.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claims as follows:

1. A data transmission system comprising:
an information processing apparatus connected to a network, for managing data transmission from a transmitter to a receiver;
a first relaying apparatus connected to the network and the transmitter, for relaying the data transmission from the transmitter; and
a second relaying apparatus connected to the network and the receiver, for relaying the data transmission to the receiver,
the information processing apparatus including:
authentication means for authenticating a user of the transmitter;
search means for searching user email address information related to the second relaying apparatus; and
query means for querying the second relaying apparatus whether the second relaying apparatus can receive data transmitted from the transmitter authenticated by the authentication means,
the first relaying apparatus including:
first acquisition means for acquiring data to be transmitted from the transmitter; and
first retaining means for retaining the data acquired by the first acquisition means; and
first supply means for supplying the data retained by the first retaining means to the second relaying apparatus, in accordance with the result of the query performed by the query means of the information processing apparatus,
the second relaying apparatus including:
determination means for, in response to the query issued by the query means of the information processing apparatus, determining whether the receiver can receive the data, the determination being based on at least adequate storage capacity to store the data and made prior to the data being received by the receiver;
second acquisition means for acquiring the data from the first relaying apparatus; second retaining means for retaining the data acquired by the second acquisition means; and second supply means for supplying the data retained by the second retaining means to the receiver.

2. An infonnation processing apparatus connected to a network, for managing data transmission from a transmitter to a receiver, comprising:
storage means for storing address infonnation of the transmitter,
a first relaying apparatus connected to the transmitter, and
a second relaying apparatus connected to the receiver;
address information management means for managing the address information stored in the storage means;
authentication means for authenticating a user of the transmitter;
search means for searching previously stored user email address information related to the second relaying apparatus;
first supply means for supplying request information supplied from the first relaying apparatus to the second relaying apparatus, the request information requesting determining whether transmission of data can be accepted by the receiver, the determination being based on at least adequate storage capacity to store the data and made prior to the data being received by the receiver; and
second supply means for supplying, to the first relaying apparatus, data supplied from the second relaying apparatus and indicating the result of the determination performed in response to the request information.

3. An information processing apparatus according to claim 2, further comprising communication mediator means for mediating communication between other apparatuses, in accordance with the address information managed by the address information management means.

4. An information processing apparatus according to claim 2, wherein the authentication means authenticates the user by verifying digital signature data supplied from the transmitter, on the basis of a public key registered in advance by the user.

5. An information processing apparatus according to claim 2, wherein the request information includes information associated with the data to be transmitted.

6. An information processing method for an information processing apparatus connected to a network to manage data transmission from a transmitter to a receiver, comprising:
a storage step for storing address information of the transmitter, a first relaying apparatus connected to the transmitter, and a second relaying apparatus connected to the receiver;
an address information management step of managing the address information stored in the storage step;
an authentication step of authenticating a user of the transmitter;
a searching step for searching previously stored user email address information related to the second relaying apparatus;
a first supply step of supplying based on said user address information request information supplied from the first relaying apparatus to the second relaying apparatus, the request information requesting determining whether transmission of data can be accepted by the receiver, the determination being based on at least adequate storage capacity to store the data and made prior to the data being received by the receiver; and a second supply step of supplying, to the first relaying apparatus, data supplied from the second relaying apparatus and indicating the result of the determination performed in response to the request information.

7. A storage medium including a computer-readable program stored thereon, the program including executable instructions that when executed by a computer perform steps for controlling an information processing apparatus connected to a network, said information processing apparatus serving to manage data transmission from a transmitter to a receiver, said steps comprising:

a storage step for storing address information of the transmitter, a first relaying apparatus connected to the transmitter, and a second relaying apparatus connected to the receiver;

an address information management step of managing the address information stored in the storage step;

an authentication step of authenticating a user of the transmitter;

a searching step for searching previously stored user email address information related to the second relaying apparatus;

a first supply step of supplying request information supplied from the first relaying apparatus to the second relaying apparatus, the request information requesting determination of whether transmission of data can be accepted by the receiver, the determination being based on at least adequate storage capacity to store the data and made prior to the data being received by the receiver; and a second supply step of supplying, to the first relaying apparatus, data supplied from the second relaying apparatus and indicating the result of the determination performed in response to the request information.

8. A program stored on a computer-readable medium including executable instructions that when executed by a computer perform steps for controlling an information processing apparatus connected to a network, said information processing apparatus serving to manage data transmission from a transmitter to a receiver, said steps comprising:

a storage step for storing address information of the transmitter, a first relaying apparatus connected to the transmitter, and a second relaying apparatus connected to the receiver;

an address information management step of managing the address information stored in the storage step;

an authentication step of authenticating a user of the transmitter;

a searching step for searching previously stored user email address information related to the second relaying apparatus;

a first supply step of supplying request information supplied from the first relaying apparatus to the second relaying apparatus, the request information requesting determination of whether transmission of data can be accepted by the receiver, the determination being based on at least adequate storage capacity to store the data and made prior to the data being received by the receiver; and a second supply step of supplying, to the first relaying apparatus, data supplied from the second relaying apparatus and indicating the result of the determination performed in response to the request information.

9. A relaying apparatus connected to a transmitter and a network, for relaying data transmission from the transmitter, comprising:

first acquisition means for acquiring data to be transmitted from the transmitter; retaining means for retaining the data acquired by the first acquisition means;

first supply means for supplying request information to an information processing apparatus managing the transmission of data, the request information including a request to the information processing apparatus for a search of previously stored user email address information related to another relaying apparatus, and a determination whether transmission of data can be accepted by the other relaying apparatus, the determination being based on at least adequate storage capacity to store the data and made prior to the data being received by a receiver;

second acquisition means for acquiring, from the information processing apparatus, the result of determination performed in response to the request information supplied from the first supply means; and second supply means for supplying the data retained by the retaining means to another relaying apparatus connected to the receiver specified as a destination, in accordance with the result of the determination acquired by the second acquisition means.

10. A relaying apparatus according to claim 9, wherein the request information includes information associated with the data to be transmitted.

11. A relaying apparatus according to claim 9, wherein the first acquisition means acquires all of said data at a time; and the retaining means retains the data entirely acquired by the first acquisition means.

12. A relaying apparatus according to claim 9, wherein the first acquisition means acquires the data in the form of streaming data and the retaining means retains in real time the data acquired by the first acquisition means.

13. A relaying method for a relaying apparatus connected to a transmitter and a network to relay data transmission from the transmitter, comprising:

a first acquisition step of acquiring data to be transmitted from the transmitter;

a retaining step of retaining the data acquired in the first acquisition step;

a first supply step of supplying request information to an information processing apparatus managing the transmission of data, the request information including a request to the information processing apparatus for a search of previously stored user email address information related to another relaying apparatus, and a determination whether transmission of data can be accepted by the other relaying apparatus, the determination being based on at least adequate storage capacity to store the data and made prior to the data being received by a receiver;

a second acquisition step of acquiring, from the information processing apparatus, the result of determination performed in response to the request information supplied in the first supply step; and a second supply step of supplying the data retained in the retaining step to another relaying apparatus connected to the receiver specified as a destination, in accordance with the result of the determination acquired in the second acquisition step.

14. A storage medium including a computer-readable program stored thereon, the program including executable instructions that when executed by a computer perform steps for controlling a relaying apparatus connected to a transmitter and a network to relay data transmission from the transmitter, said steps comprising:
   a first acquisition step of acquiring data to be transmitted from the transmitter;
   a retaining step of retaining the data acquired in the first acquisition step;
   a first supply step of supplying request information to an information processing apparatus managing the transmission of data, the request information including a request to the information processing apparatus for a search of previously stored user email address information related to another relaying apparatus, and a determination whether transmission of data can be accepted by the other relaying apparatus, the determination being based on at least adequate storage capacity to store the data and made prior to the data being received by a receiver;
   a second acquisition step of acquiring, from the information processing apparatus, the result of determination performed in response to the request information supplied in the first supply step; and
   a second supply step of supplying the data retained in the retaining step to another relaying apparatus connected to the receiver specified as a destination, in accordance with the result of the determination acquired in the second acquisition step.

15. A program stored on a computer-readable medium including executable instructions that when executed by a computer perform steps for controlling a relaying apparatus connected to a transmitter and a network to relay data transmission from the transmitter, said steps comprising:
   a first acquisition step of acquiring data to be transmitted from the transmitter;
   a retaining step of retaining the data acquired in the first acquisition step;
   a first supply step of supplying request information to an information processing apparatus managing the transmission of data, the request information including a request to the information processing apparatus for a search of previously stored user email address information related to another relaying apparatus, and a determination whether transmission of data can be accepted by the other relaying apparatus, the determination being based on at least adequate storage capacity to store the data and made prior to the data being received by a receiver;
   a second acquisition step of acquiring, from the information processing apparatus, the result of determination performed in response to the request information supplied in the first supply step; and
   a second supply step of supplying the data retained in the retaining step to another relaying apparatus connected to the receiver specified as a destination, in accordance with the result of the determination acquired in the second acquisition step.

16. A relaying apparatus connected to a receiver and a network, for relaying data transmission to the receiver, comprising:
   first acquisition means for acquiring request information from an information processing apparatus managing the transmission of data, said request information including previously stored user email address information related to said relying apparatus, and requesting determination of whether the receiver can receive data;
   determination means for determining whether the receiver can receive data, in accordance with the request information acquired by the first acquisition means, the determination being based on at least adequate storage capacity to store the data and made prior to the data being received by the receiver;
   first supply means for supplying data indicating the result of the determination performed by the determination means to the information processing apparatus;
   second acquisition means for acquiring the data from another relaying apparatus connected to the transmitter;
   retaining means for retaining the data acquired by the second acquisition means; and
   second supply means for supplying the data retained by the retaining means to the receiver.

17. A relaying apparatus according to claim 16, wherein the request information includes information associated with data to be transmitted;
   the relaying apparatus further includes an information storage means for storing information associated with the receiving ability of the receiver; and
   the determination means performs said determination on the basis of the information associated with the data, included in the request information and, and on the basis of the information associated with the receiving ability of the receiver, stored in the receiving ability information storage means.

18. A relaying apparatus according to claim 16, wherein the second supply means supplies all of said data at a time.

19. A relaying apparatus according to claim 16, wherein the second supply means supplies said data in the form of streaming data to the receiver, and the receiver displays the data while acquiring the data.

20. A relaying method for a relaying apparatus connected to a receiver and a network to relay data transmission to the receiver, comprising:
   a first acquisition step of acquiring request information from an information processing apparatus managing the transmission of data, said request information including previously stored user email address information related to said relying apparatus, and requesting determination of whether the receiver can receive data;
   a determination step of determining whether the receiver can receive data, in accordance with the request information acquired in the first acquisition step, the determination being based on at least adequate storage capacity to store the data and made prior to the data being received by the receiver;
   a first supply step of supplying data indicating the result the determination performed in the determination step to the information processing apparatus;
   a second acquisition step of acquiring the data from another relaying apparatus connected to the transmitter;
   a retaining step of retaining the data acquired in the second acquisition step; and
   a second supply step of supplying the data retained in the retaining step to the receiver.

21. A storage medium including a computer-readable program stored thereon, the program including executable instructions that when executed by a computer perform steps for controlling a relaying apparatus connected to a receiver and a network to relay data transmission to the receiver, said steps comprising:
   a first acquisition step of acquiring request information from an information processing apparatus managing the transmission of data, said request information including previously stored user email address information related to said relying apparatus, and requesting determining whether the receiver can receive data;

a determination step of determining whether the receiver can receive data, in accordance with the request information acquired in the first acquisition step, the determination being based on at least adequate storage capacity to store the data and made prior to the data being received by the receiver;

a first supply step of supplying data indicating the result of the determination performed in the determination step to the information processing apparatus;

a second acquisition step of acquiring the data from another relaying apparatus connected to the transmitter;

a retaining step of retaining the data acquired in the second acquisition step; and a second supply step of supplying the data retained in the retaining step to the receiver.

22. A program stored on a computer-readable medium including executable instructions that when executed by a computer perform steps for controlling a relaying apparatus connected to a receiver and a network to relay data transmission to the receiver, said steps comprising:

a first acquisition step of acquiring request information from an information processing apparatus managing the transmission of data, said request information including previously stored user email address information related to said relying apparatus, and requesting determining whether the receiver can receive data;

a determination step of determining whether the receiver can receive data, in accordance with the request information acquired in the first acquisition step, the determination being based on at least adequate storage capacity to store the data and made prior to the data being received by the receiver;

a first supply step of supplying data indicating the result of the determination performed in the determination step to the information processing apparatus;

a second acquisition step of acquiring the data from another relaying apparatus connected to the transmitter;

a retaining step of retaining the data acquired in the second acquisition step; and a second supply step of supplying the data retained in the retaining step to the receiver.

23. The data transmission system of claim 1, wherein the determination is based on a current time.

24. The information processing apparatus of claim 2, wherein the determination is based on a current time.

25. The information processing method of claim 6, wherein the determination is based on a current time.

26. The storage medium of claim 7, wherein the determination is based on a current time.

27. The program of claim 8, wherein the determination is based on a current time.

28. The relaying apparatus of claim 9, wherein the determination is based on a current time.

29. The relaying method of claim 13, wherein the determination is based on a current time.

30. The storage medium of claim 14, wherein the determination is based on a current time.

31. The program of claim 15, wherein the determination is based on a current time.

32. The relaying apparatus of claim 16, wherein the determination is based on a current time.

33. The relaying method of claim 20, wherein the determination is based on a current time.

34. The storage medium of claim 21, wherein the determination is based on a current time.

35. The program of claim 22, wherein the determination is based on a current time.

* * * * *